(12) United States Patent
DeHaan et al.

(10) Patent No.: US 9,679,122 B1
(45) Date of Patent: Jun. 13, 2017

(54) METHODS AND APPARATUS FOR USING CREDENTIALS TO ACCESS COMPUTING RESOURCES

(71) Applicant: Ansible, Inc., Durham, NC (US)

(72) Inventors: Michael P. DeHaan, Morrisville, NC (US); Christopher S. Church, Durham, NC (US); Christopher L. Houseknecht, Wake Forest, NC (US); Matthew W. Jones, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/301,934

(22) Filed: Jun. 11, 2014

(51) Int. Cl.
*G06F 21/31* (2013.01)
(52) U.S. Cl.
CPC .................... *G06F 21/31* (2013.01)
(58) Field of Classification Search
CPC ....................................................... G06F 21/31
See application file for complete search history.

(56) References Cited

U.S. PATENT DOCUMENTS

| | | | |
|---|---|---|---|
| 7,085,925 B2* | 8/2006 | Hanna et al. | 713/157 |
| 7,353,282 B2* | 4/2008 | Nichols et al. | 709/229 |
| 7,882,549 B2* | 2/2011 | Edwards et al. | 726/5 |
| 2003/0135755 A1 | 7/2003 | Hahn | |
| 2010/0077469 A1* | 3/2010 | Furman | G06F 21/41 726/8 |
| 2011/0231940 A1* | 9/2011 | Perumal et al. | 726/28 |
| 2011/0265147 A1* | 10/2011 | Liu | 726/4 |
| 2014/0115003 A1 | 4/2014 | Paymal et al. | |
| 2014/0173755 A1* | 6/2014 | Wahl | G06F 21/6218 726/28 |

OTHER PUBLICATIONS

Author Unknown, "Ansible Tower User Guide," Ansible Tower, Version 1.4.8, Ansible, Apr. 7, 2014, 115 pages.
Non-Final Office Action for U.S. Appl. No. 14/301,849, mailed Apr. 15, 2016, 11 pages.
Notice of Allowance for U.S. Appl. No. 14/301,849, mailed Nov. 25, 2016, 7 pages.

* cited by examiner

*Primary Examiner* — Kambiz Zand
*Assistant Examiner* — Thanh Le
(74) *Attorney, Agent, or Firm* — Withrow & Terranova, PLLC

(57) ABSTRACT

Mechanisms for controlling access to credentials are disclosed. A computing device receives, at a first time, a request associated with a user to initiate a plurality of actions against a computing resource of a plurality of computing resources, the request including a credential identifier that identifies a credential. A memory is accessed, based on the credential identifier, to retrieve the credential identified by the credential identifier that was stored in the memory at a time prior to the first time, the credential comprising authentication information configured to authenticate the plurality of actions to the computing resource. The computing device communicates the request and the authentication information to an orchestration engine for execution of the plurality of actions against the computing resource.

18 Claims, 22 Drawing Sheets

METHODS AND APPARATUS FOR USING CREDENTIALS TO ACCESS COMPUTING RESOURCES

TECHNICAL FIELD

The embodiments relate generally to controlling access to computing resources.

BACKGROUND

Complex software systems are typically designed, developed, debugged, deployed, maintained and updated by a group of individuals, such as developers and/or administrators (referred to collectively herein as "users"), employed by a software manufacturing entity. Each user may have a particular role, or multiple roles, in the process, such as writing software updates, testing software, deploying the software in a production environment, upgrading the software in the production environment, and the like. The computing resources on which particular functions are performed may be different. Even the ownership of the computing resources on which the functions are performed may differ.

Establishing security in such an environment can be complex, and can be a bottleneck to efficiency, but is increasingly important in view of the potential damage a hacker can intentionally cause, as well as in view of the disruption even a legitimate user can inadvertently cause. Security can be implemented at many different levels, such as creating security definitions that define which users are permitted to perform which actions on which computing resources, and which users are permitted to modify such security definitions. Moreover, each computing resource may have its own security authentication requirements, which, for example, may require that authentication data, sometimes referred to as credentials, such as user identifiers and passwords, be provided before allowing commands to be performed on the computing resource. Credentials have their own security issues, because the authentication data must be provided to the users that need to perform actions against the computing resources, yet, it is desirable that such information be tightly controlled and restricted to ensure that unauthorized access to a computing resource is prevented. If such users leave the software manufacturing entity, all such authentication data must be changed, to ensure that the ex-employee no longer has access to the computing resources. Implementing new authentication data may be onerous and time-consuming, and may involve removing the old authentication data from each computing resource, implementing the new authentication data on each computing resource, and then providing the new authentication data to appropriate users who need access to the computing resources in order to perform the functions for which they are responsible. Due to the onerous nature of changing authentication data, sometimes it is not done immediately, leaving the ex-employee with access to a computing resource.

Accordingly, there is a need for improved security mechanisms that ease the administration of security in a complex software development environment, while maintaining flexibility and a highly secure environment.

SUMMARY

The embodiments provide a role-based access control mechanism that implements access control rights in a flexible and intuitive manner based, in part, on the role of a user. The embodiments also implement credential control mechanisms that allow users to use credentials, without disclosing to the users the underlying authentication data associated with the credential. The embodiments implement access control rights in part by implementing access control elements that are modeled based on the manner in which complex software systems are designed, implemented, and maintained.

In one embodiment, a request to initiate an action against a computing resource of a plurality of computing resources is received from a user. A plurality of permission definitions that identify a plurality of corresponding permissions that grant access to the plurality of computing resources are accessed. Based on a set of permissions comprising at least one permission associated with the user and at least one permission associated with a team of which the user is a member, it is determined that at least one permission in the set of permissions grants the user access to the computing resource. The request to initiate the action against the computing resource is processed.

In another embodiment, a computing device receives at a first time a request associated with a user to initiate a plurality of actions against a computing resource of a plurality of computing resources. The request includes a credential identifier that identifies a credential. The computing device accesses a memory, based on the credential identifier, to retrieve a credential identified by the credential identifier that was stored in the memory at a time prior to the first time. The credential comprises authentication information configured to authenticate the action to the computing resource. The computing device communicates the request and the authentication information to an orchestration engine for execution of the plurality of actions against the computing resource.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first credential" and "second credential," and does not imply a priority, a type, an importance, or other attribute, unless otherwise stated herein. The term "about" used herein in conjunction with a numeric value means any value that is within a range of ten percent greater than or ten percent less than the numeric value.

The embodiments provide a role-based access control mechanism that implements access control rights in a flexible and intuitive manner based, in part, on the role of an individual involved in the manufacture, maintenance, or other aspect of a software system. Such an individual will be referred to herein as a user. The embodiments implement access control in part by implementing access control elements that are modeled based on the manner in which complex software systems are designed, implemented, and maintained. The embodiments also implement credential control mechanisms that allow users to use credentials, without disclosing to the users the underlying authentication data associated with the credential.

Figure 1:
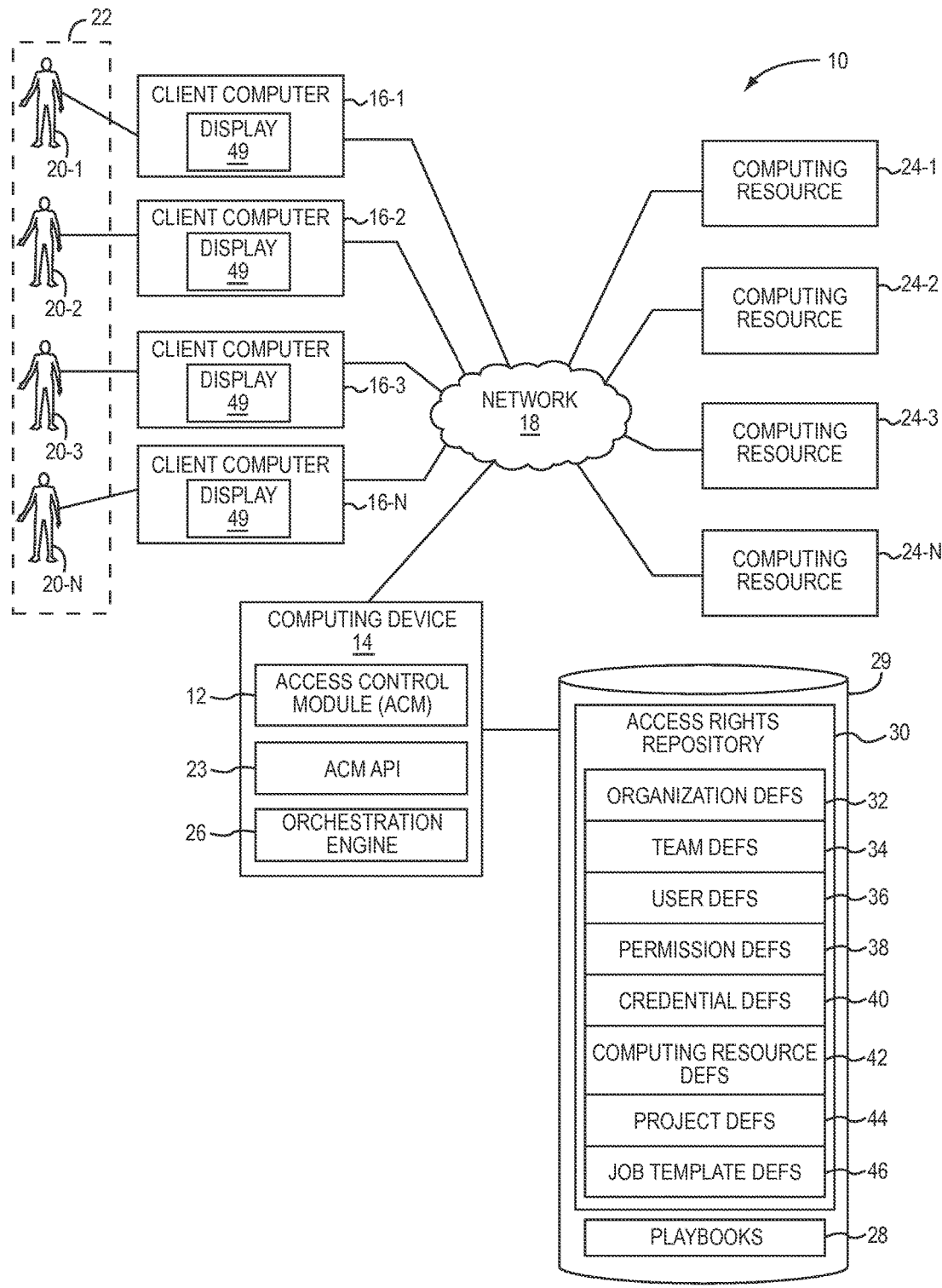
FIG. 1 is a block diagram of a system in which embodiments may be practiced.

FIG. 1 is a block diagram of a system 10 in which embodiments may be practiced. The system 10 includes an access control module 12 that executes on a computing device 14. The computing device 14 may comprise a computer server, a desktop computer, laptop computer, tablet computer, or the like. The computing device 14 is coupled to a plurality of client computers 16-1-16-N (generally, client computers 16) via a network 18. The client computers 16 may comprise any suitable computing devices on which corresponding users 20-1-20-N (generally, users 20) may desire to perform a task related to the development, deployment, maintenance, or other function associated with a software system, such as a desktop computer, laptop computer, tablet computer, or the like. The users 20, in one embodiment, may be employees of an entity 22 that is in the business of developing and maintaining complex software systems.

The network 18 may comprise any suitable public network, proprietary network or combination thereof that facilitates communication between the computing device 14 and client computers 16. In some embodiments, the access control module 12 may have an associated application programming interface (API) 23 that facilitates programmatic access to the access control module 12, such that some or all of the functionality described herein in conjunction with user input and user interfaces may be similarly implemented via programmatic interaction with the API 23.

The computing device 14 is also in communication with one or more computing resources 24-1-24-N (generally, computing resources 24). A computing resource 24 may comprise any object for which it is desired to control access. The computing resource 24-1, for example, may comprise a computer server. The computing resource 24-2 may be a cloud computing resource, and may comprise a plurality of computer servers. The phrase "cloud computing" refers to a group of computing devices, such as a group of computer servers. The computing resource 24-3 may comprise a database server. While for purposes of illustration and relative simplicity the computing resources 24 will be discussed herein in the context of being individual computers, such as computer servers, the embodiments are not limited to any particular type of computing resource.

The users 20 may have different functions related to the software system produced by the entity 22. For example, the user 20-1 may be responsible for testing pre-production versions of the software system. The user 20-2 may be responsible for deploying a version of the software system into a production environment. The user 20-3 may be responsible for developing new features on an existing version of the software system. Each of these functions may require access to certain computing resources 24, but not require access to other computing resources 24.

In the course of performing tasks on the computing resources 24, it is often desirable that such tasks be automated to provide consistency, efficiency, and automation to the process. An orchestration engine 26 is one mechanism utilized to facilitate the automation of such tasks. The orchestration engine 26 accesses sets of actions that are to be performed against one or more of the computing resources 24, and coordinates the performance of the actions. Such sets of actions will be referred to herein as a playbook 28, but the sets of actions may take any desired form so long as the sets of actions are written in a manner, such as being written in a particular programming language, protocol, or format, that is understood by the respective orchestration engine 26. In one embodiment, the orchestration engine 26 comprises the Ansible IT automation platform available from Ansible, 312 Blackwell St., Suite 100, Durham, N.C. 27701; however, the embodiments are not limited to any particular orchestration engine 26. Similarly, the playbooks 28 may, in one embodiment, be expressed in YAML Ain't Markup Language (YAML) format, but the embodiments are not limited to any particular format or programming language.

The computing resources 24 may each implement a security, or authentication mechanism, to ensure that actions performed against the respective computing resource 24 by the orchestration engine 26 are authorized. The authentication mechanism will be referred to herein as a credential, as described in greater detail herein, and may be provided by the orchestration engine 26 to the respective computing resource 24 prior to implementing any actions on the computing resource 24. If the computing resource 24 accepts the credentials as valid, the computing resource 24 permits actions to be performed on the computing resource 24. Otherwise, the computing resource 24 does not allow actions to be performed on the computing resource 24.

The access control module 12, among other features, implements a multiple-level security mechanism that ensures that the users 20 have the appropriate access to the computing resources 24, and that such users 20 have access to the credentials required by the computing resources 24 in order to perform actions on the computing resources 24. The security mechanism is implemented in part via access control elements that are stored in an access rights repository 30, in a memory device such as a storage 29. The access control elements are modeled based on a manner in which software systems are often developed, and include, by way of non-limiting example, elements that model organizations, teams, users, permissions, credentials, and projects. In one embodiment, the access control elements are defined via a user interface, and stored as corresponding definitions in the access rights repository 30. Thus, the access rights repository 30 may include one or more organization definitions 32, one or more team definitions 34, one or more user definitions 36, one or more permission definitions 38, one or more credential definitions 40, one or more computing resource definitions 42, one or more project definitions 44, and one or more job template definitions 46 (generally, access control definitions 48).

When a user 20 desires to execute a playbook 28 against a computing resource 24, the access control module 12 facilitates the generation of a job template based on the rights, referred to herein as permissions, granted to the user 20, and ensures that the user 20 has permission to access the computing resource 24, and has been given permission to access any credentials required by the respective computing resource 24. In the event the user 20 either has not been provided permission to access the computing resource 24, or has not been given permission to utilize a credential required by the respective computing resource 24, the user 20 will not be able to perform the requested actions against the computing resource 24.

Mechanisms for generating the access control definitions 48 will now be discussed, in conjunction with example data that may be provided in the course of generating an access control definition 48. For purposes of illustration, the generation of access control definitions 48 will be discussed in conjunction with a user interface wherein the user 20-1 has, as part of a setup phase of the access control module 12, been given superuser rights such that the user 20-1 is permitted unrestricted rights to generate access control definitions 48. Assume that the user 20-1 desires to define an organization to the access control module 12. In one embodiment, the access control module 12 interfaces with the client computer 16-1 via a web interface, and in response to queries from the client computer 16-1 provides data that may be presented to the user 20-1 via a display 49 associated with the client computer 16-1. The user 20-1 may select a link, such as a uniform resource locator, that causes the access control module 12 to provide a web application that executes on the client computer 16-1. After the user 20-1 has logged in and provided sufficient authorization information to identify the user 20-1 to the access control module 12, the access control module 12 may provide a user interface that allows the user 20-1 to generate, delete, or modify one or more access control definitions 48.

Figure 2:
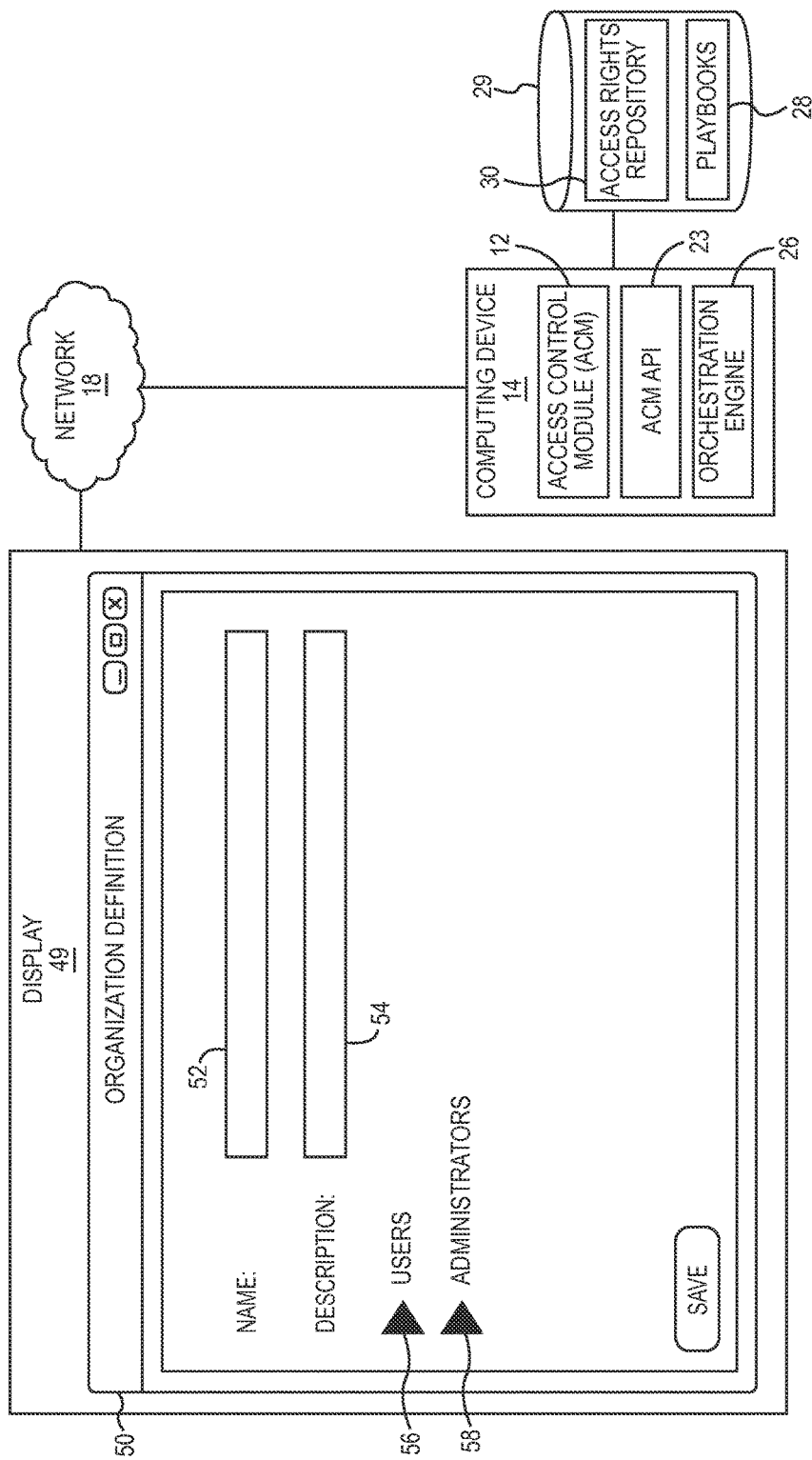
FIG. 2 is a diagram of an example user interface window for generating an organization definition according to one embodiment.

FIG. 2 is a diagram of an example user interface window 50 for generating an organization definition 32 according to one embodiment. The user interface window 50 includes a name control 52 that enables the user 20-1 to provide an organization identifier, such as an organization name, and a description control 54 that enables the user 20-1 to provide an organization description. A user control 56 enables the user 20-1 to create a user definition 36 that identifies a user 20 to the access control module 12. The generation of a user definition 36 will be discussed below. A user control 58 enables the user 20-1 to identify certain users 20 as administrators, who have rights to generate other access control definitions 48 associated with this particular organization.

Figure 3:
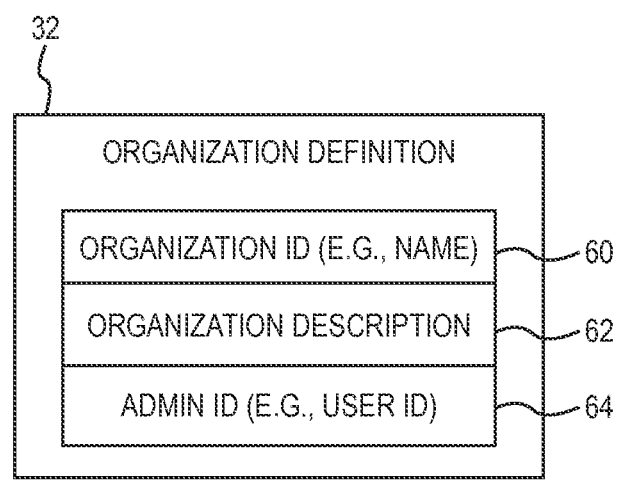
FIG. 3 is a block diagram illustrating an organization definition according to one embodiment.

FIG. 3 is a block diagram illustrating an organization definition 32 according to one embodiment. The organization definition 32 includes an organization identifier field 60 that contains an organization identifier, such as a name of an organization. An organization description field 62 contains a description of the organization. An administrator identifier field 64 identifies one or more users 20 that have been given administrator privileges, as discussed above, for the organization.

Figure 4:
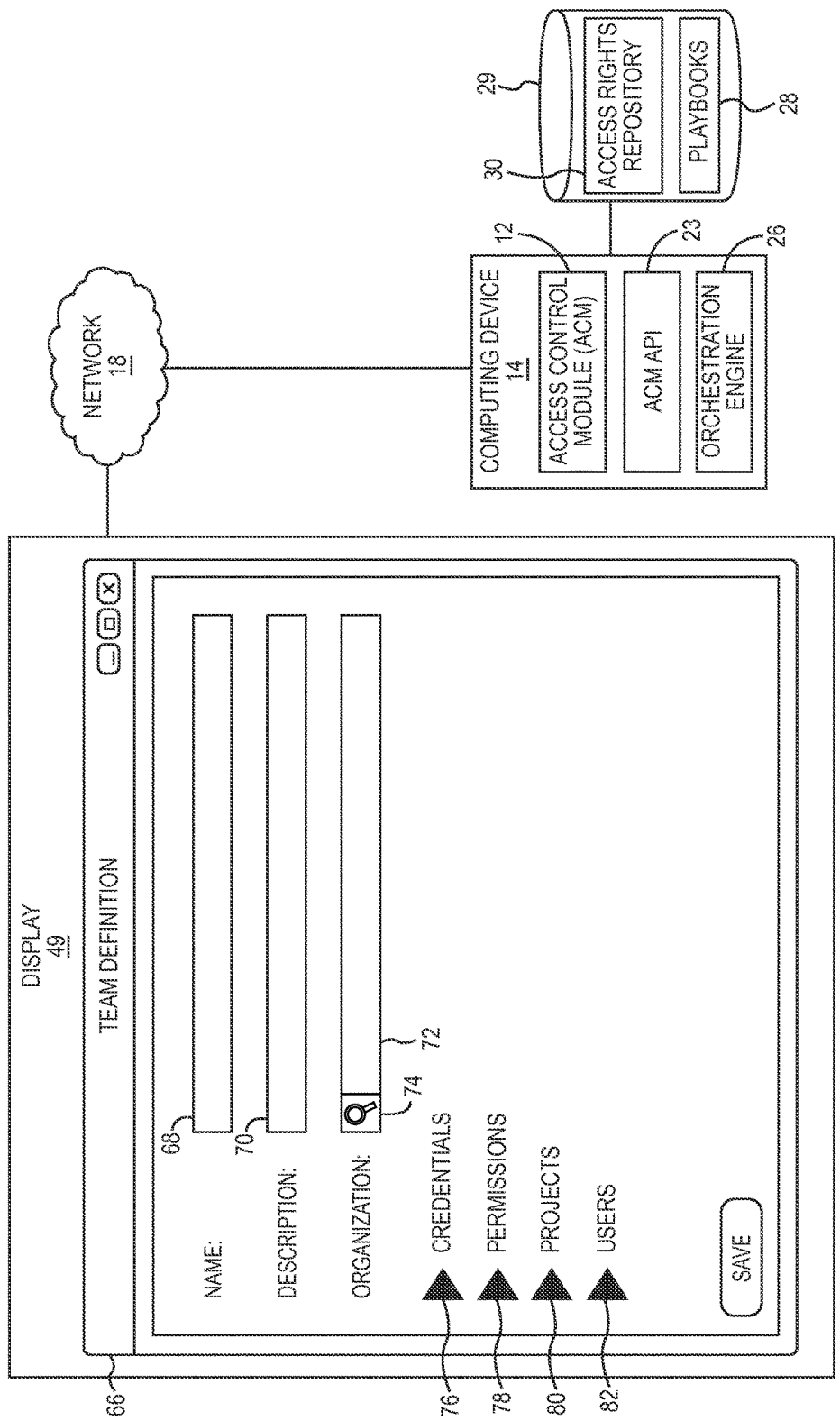
FIG. 4 is a diagram of an example user interface window for generating an team definition according to one embodiment.

FIG. 4 is a diagram of an example user interface window 66 for generating a team definition 34 according to one embodiment. A team defines an object, or element, that allows users 20 to be given permissions based on a role of the user 20 as a member of the respective team. A team is also a mechanism by which a user 20 may be given rights to utilize a credential for accessing a computing resource 24. The user interface window 66 includes a team name control 68 that enables the user 20-1 to provide a team identifier, such as a team name. By way of non-limiting example, the team name may be based on a role of the team, such as "Development Team," "Implementation Team," "New Features Team," and the like. A team description control 70 enables the user 20-1 to provide a team description. An organization control 72 enables the user 20-1 to identify an organization with which the team will be associated. Selection of an organization search control 74 causes the access control module 12 to access the access rights repository 30 and list the organizations defined in the access rights repository 30. The user 20-1 may select one of such listed organizations. The user 20-1 may select a credentials control 76 to identify credentials that are available to be assigned to the team, and/or to access a credential user interface window that facilitates the generation of a credential, as discussed in greater detail below. The user 20-1 may select a permissions control 78 to identify permissions that are available to be assigned to the team, and/or to create a new permission that may be assigned to the team. The user 20-1 may select a projects control 80 to identify projects that are available to be associated with the team. The user 20-1 may select a users control 82 to identify users 20 that are in the organization identified in the organization control 72 and are therefore available for membership in the team.

Figure 5:
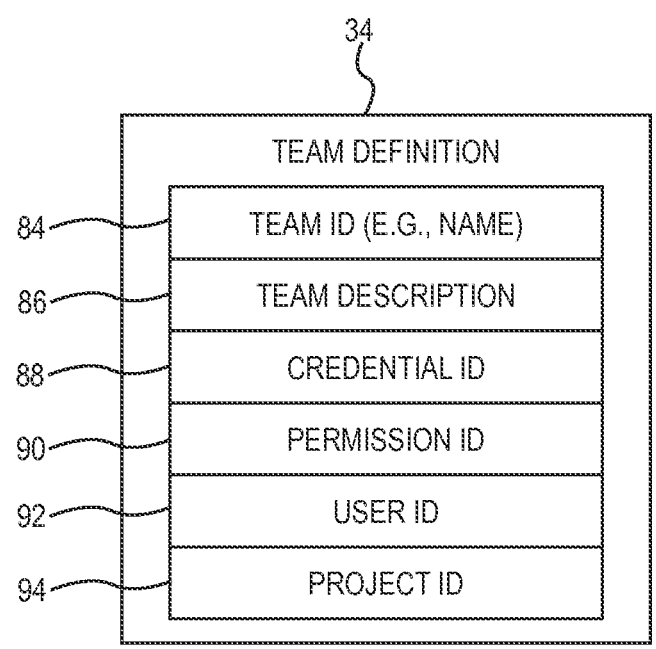
FIG. 5 is a block diagram illustrating a team definition according to one embodiment.

FIG. 5 is a block diagram illustrating a team definition 34 according to one embodiment. The team definition includes a team identifier field 84 that contains a team identifier, such as a name of the team. A team description field 86 contains a description of the team organization. One or more credential ID fields 88 identify credentials that have been identified as being available to the team. A credential that is available to a team is available to any member of the team. One or more permission ID fields 90 identify permissions that have been granted to the team. A permission that is granted to a team is granted to each member of the team. One or more user ID fields 92 identify the users 20 that are members of the team. One or more project ID fields 94 identify those projects that are available to the team. Projects that are available to a team are available to members of the team.

Figure 6:
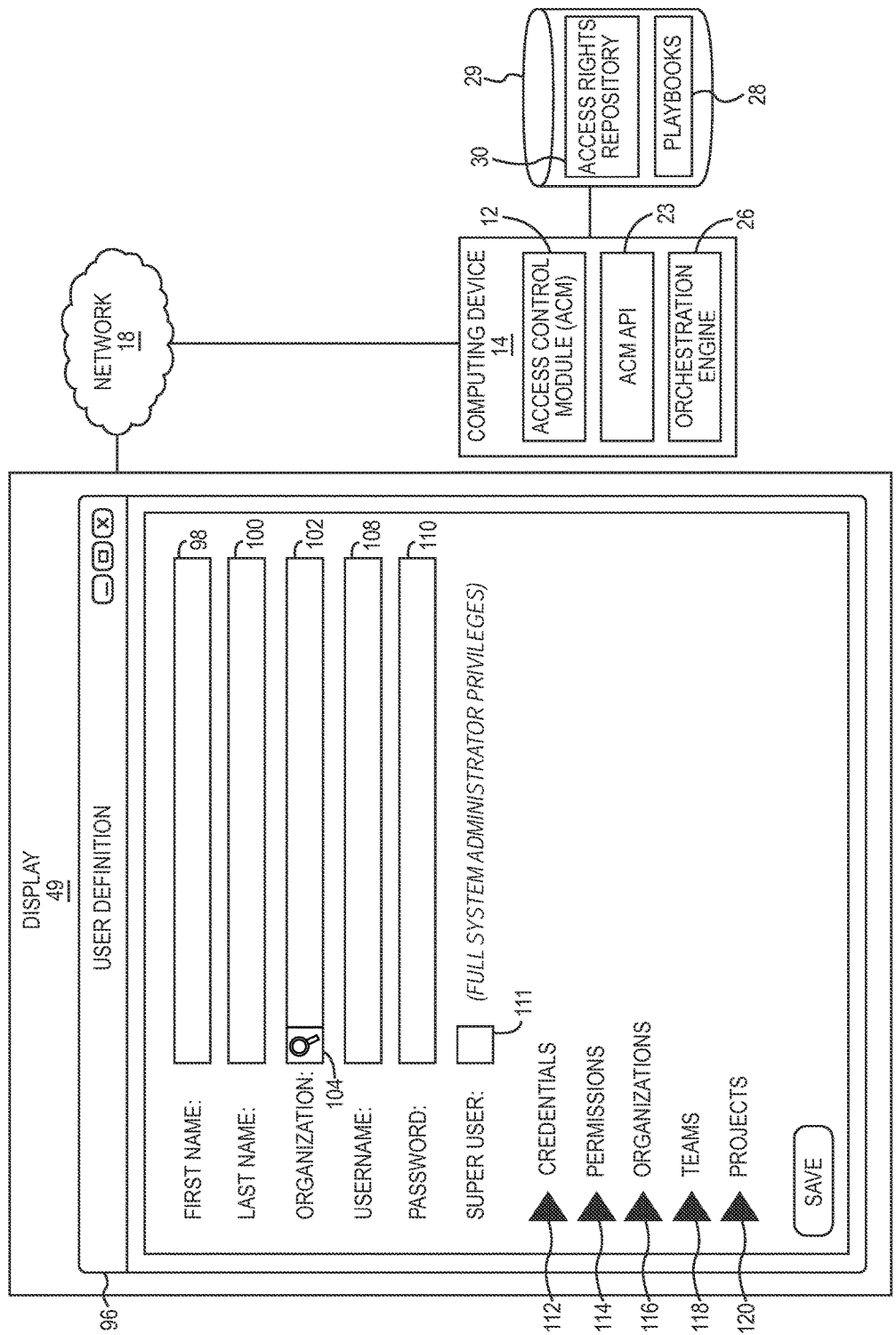
FIG. 6 is a diagram of an example user interface window for generating a user definition according to one embodiment.

FIG. 6 is a diagram of an example user interface window 96 for generating a user definition 36 according to one embodiment. A user definition 36 identifies a user 20 to the access control module 12. A first name control 98 enables the user 20-1 to provide a first name of a respective user 20, and a last name control 100 enables the user 20-1 to provide a last name of the respective user 20. An organization control 102 enables the user 20-1 to identify an organization with which the respective user 20 will be associated. Selection of an organization search control 104 causes the access control module 12 to access the access rights repository 30 and list the organizations defined in the access rights repository 30. The user 20-1 may select one of such listed organizations. A username control 108 and password control 110 enable the user 20-1 to define a username and password which the respective user 20 may use to log into the access control module 12. A superuser control 111 allows the user 20-1 to designate the respective user 20 as a superuser, which provides the user full system privileges over all aspects of the access rights repository 30.

The user 20-1 may select a credentials control 112 to identify credentials that are available to be assigned to the respective user 20, and/or to access a credential user interface window that facilitates the generation of a credential, as discussed in greater detail below. The user 20-1 may select a permissions control 114 to identify permissions that are available to be assigned to the respective user 20, and/or to create a new permission that may be assigned to the respective user 20. The user 20-1 may select an organizations control 116 to identify organizations of which this respective user 20 is a member. The user 20-1 may select a teams control 118 to identify teams of which this respective user 20 is a member. The user 20-1 may select a project control 120 to identify projects to which this respective user 20 has access.

Figure 7:
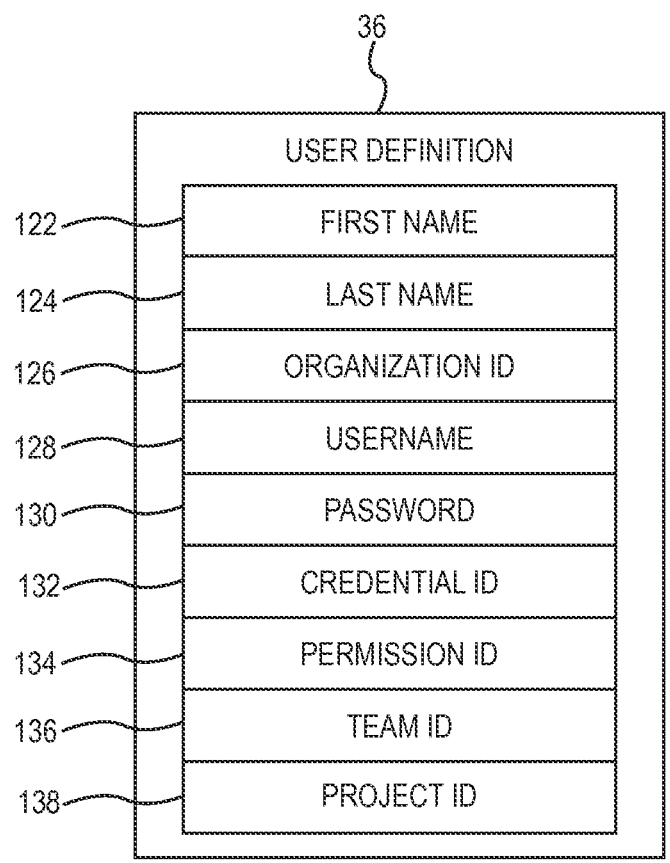
FIG. 7 is a block diagram illustrating a user definition according to one embodiment.

FIG. 7 is a block diagram illustrating a user definition 36 according to one embodiment. The user definition includes a first name field 122 and a last name field 124 that identify the first and last names of the respective user 20, respectively. One or more organization ID fields 126 identify those organizations of which the respective user 20 is a member. A username field 128 identifies the username associated with the respective user 20, and a password field 130 identifies a password that may be used by the respective user 20 to log onto the access control module 12. One or more credential ID fields 132 identify credentials that have been identified as being available to the respective user 20. One or more permission ID fields 134 identify permissions that have been granted to the respective user 20. One or more team ID fields 136 identify the teams of which the user is a member. One or more project ID fields 138 identify those projects that are available to the user.

Figure 8A:
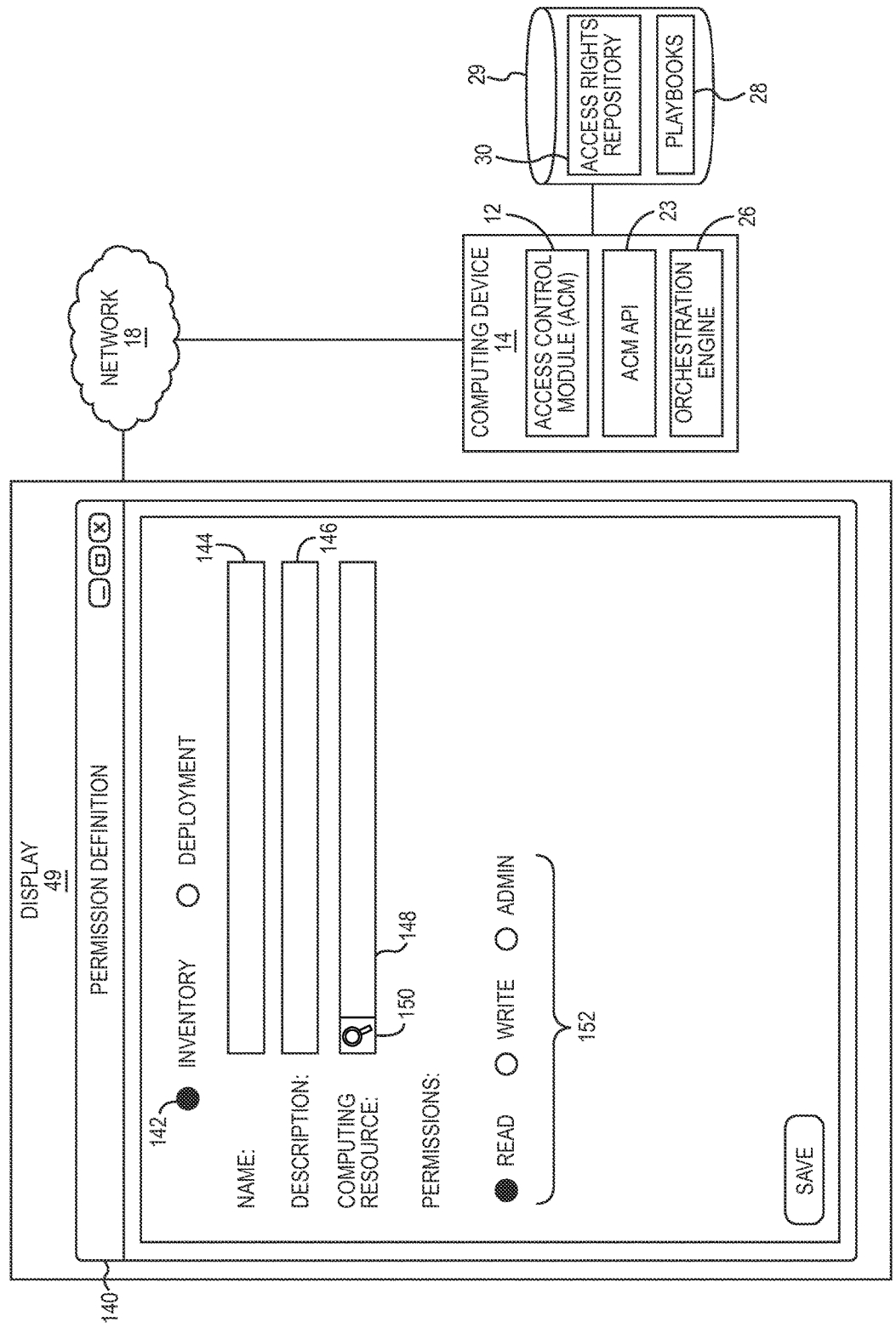
FIGS. 8A and 8B are diagrams of example user interface windows for generating permission definitions according to one embodiment.

The access control module 12 implements multiple different types of permissions, including an inventory-type permission that identifies permissions associated with adding and deleting computing resource definitions 42 to the access rights repository 30, and a deployment-type permission that identifies permissions associated with performing actions against computing resources 24. FIG. 8A is a diagram of an example user interface window 140 for generating an inventory-type permission according to one embodiment. The user 20-1 can designate that the permission is an inventory-type permission by selection of an inventory control 142. An inventory-type permission grants a user, or team, rights to read, modify, or administrate a computing resource 24, but the inventory-type permission does not grant the user or team the right to perform actions against the computing resource 24. A permission name control 144 enables the user 20-1 to provide a permission name for the permission. A permission description control 146 enables the user 20-1 to provide a permission description for the permission. A computing resource control 148 enables the user 20-1 to identify a computing resource 24 to which this permission applies. Selection of a computing resource search control 150 causes the access control module 12 to access the access rights repository 30 and list the computing resources 24. Permission controls 152 enable the user 20-1 to identify the particular rights that are granted by this permission over this particular computing resource 24.

Figure 8B:
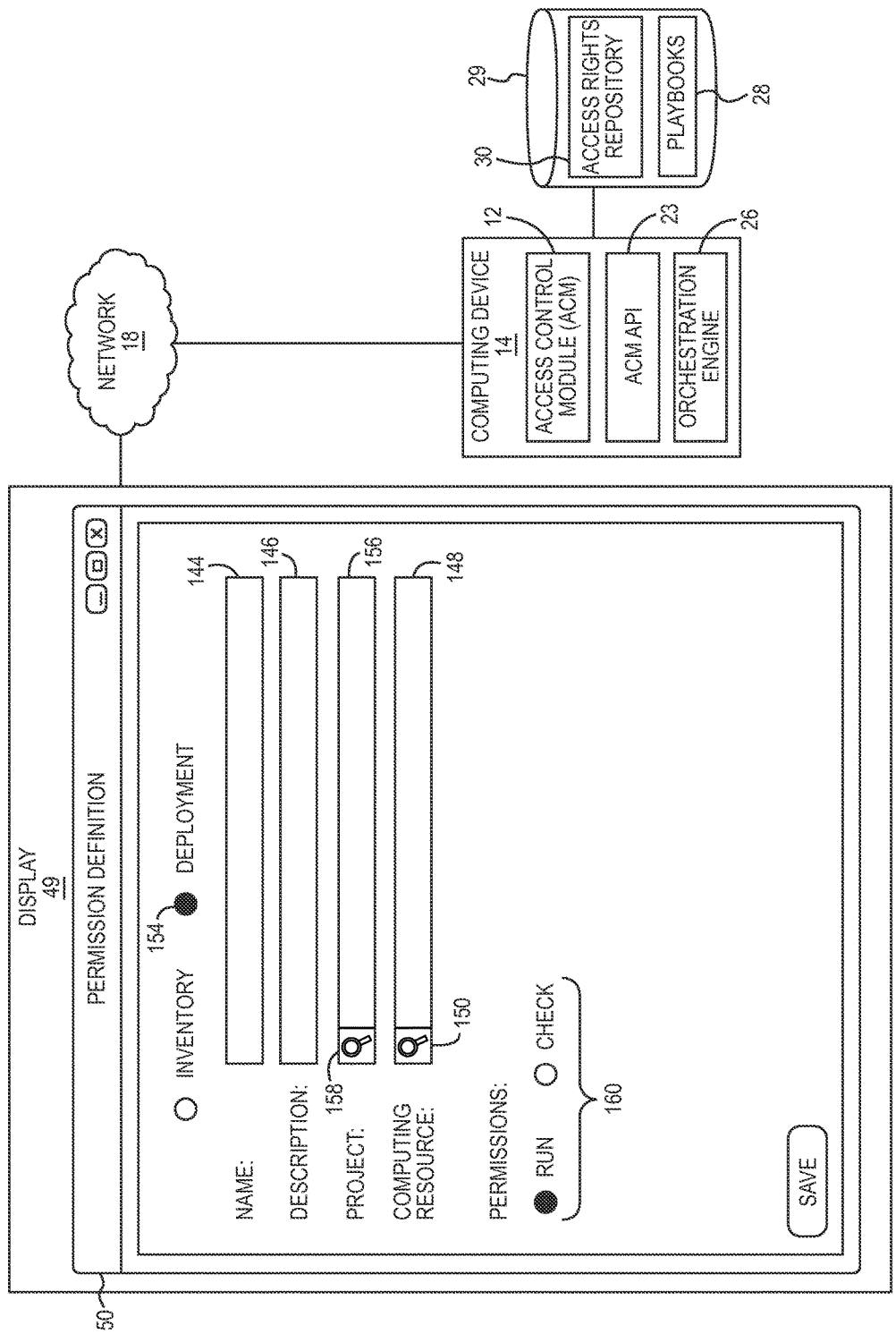

FIG. 8B is a diagram of an example user interface window 140 for generating a deployment-type permission according to one embodiment. The user 20-1 can designate that the permission is a deployment-type permission by selection of a deployment control 154. The permission name control 144 enables the user 20-1 to provide the permission name for the permission. The permission description control 146 enables the user 20-1 to provide the permission description for the permission. The computing resource control 148 enables the user 20-1 to identify a computing resource 24 to which this permission applies. Selection of the computing resource search control 150 causes the access control module 12 to access the access rights repository 30 and list the computing resources 24. Permission controls 160 enable the user 20-1 to identify the particular rights that are granted by this permission over this particular computing resource 24. A project control 156 allows the user 20-1 to designate a project with which this permission can be associated. Selection of a project search control 158 causes the access control module 12 to access the access rights repository 30 and list the projects that are available. Permission controls 160 enable the user 20-1 to identify the particular rights that are granted by this permission over this particular computing resource 24. A "Run" right grants the right to modify the computing resource 24. A "Check" right grants the right to implement a "dry-run" against the computing resource 24.

Figure 9:
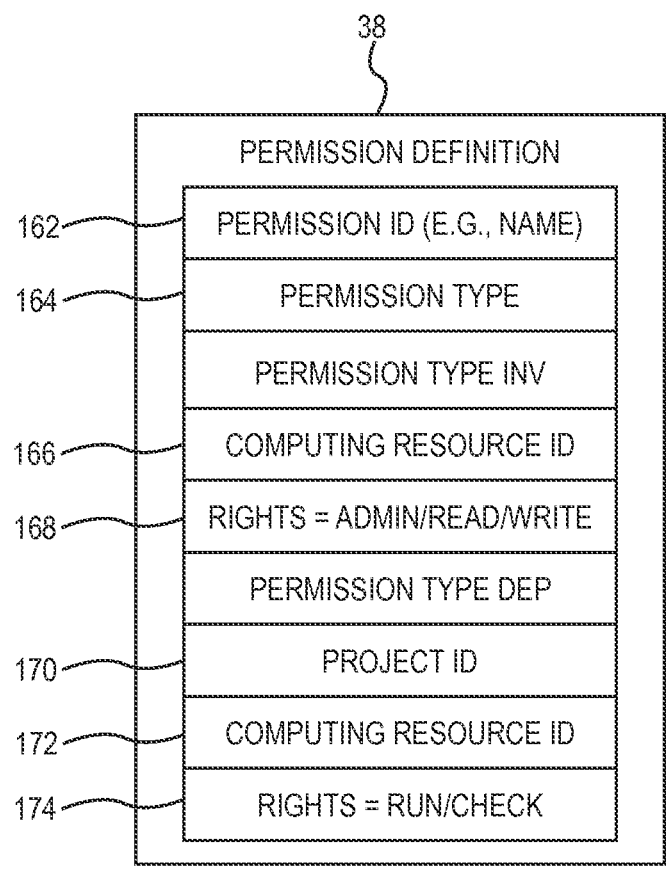
FIG. 9 is a block diagram illustrating a permission definition according to one embodiment.

FIG. 9 is a block diagram illustrating a permission definition 38 according to one embodiment. The permission definition 38 includes a permission ID field 162 that identifies a name of the permission. A permission type field 164 identifies the permission as an inventory-type permission or a deployment-type permission. If the permission is an inventory-type permission, a computing resource ID field 166 identifies the computing resource 24 to which this permission applies. A rights field 168 identifies the particular rights (e.g., read, write or admin) to the computing resource 24 granted by this permission. If the permission is a deployment-type permission, a project ID field 170 identifies a project to which this permission applies. A computing resource ID field 172 identifies the computing resource 24 to which this permission applies. A rights field 174 identifies the particular rights (e.g., Run or Check) to the computing resource 24 granted by this permission.

Credentials, as discussed above, include authentication data, such as user identifiers and passwords, which are used by a computing resource 24 to ensure actions are being performed by an authorized user.

Figure 10:
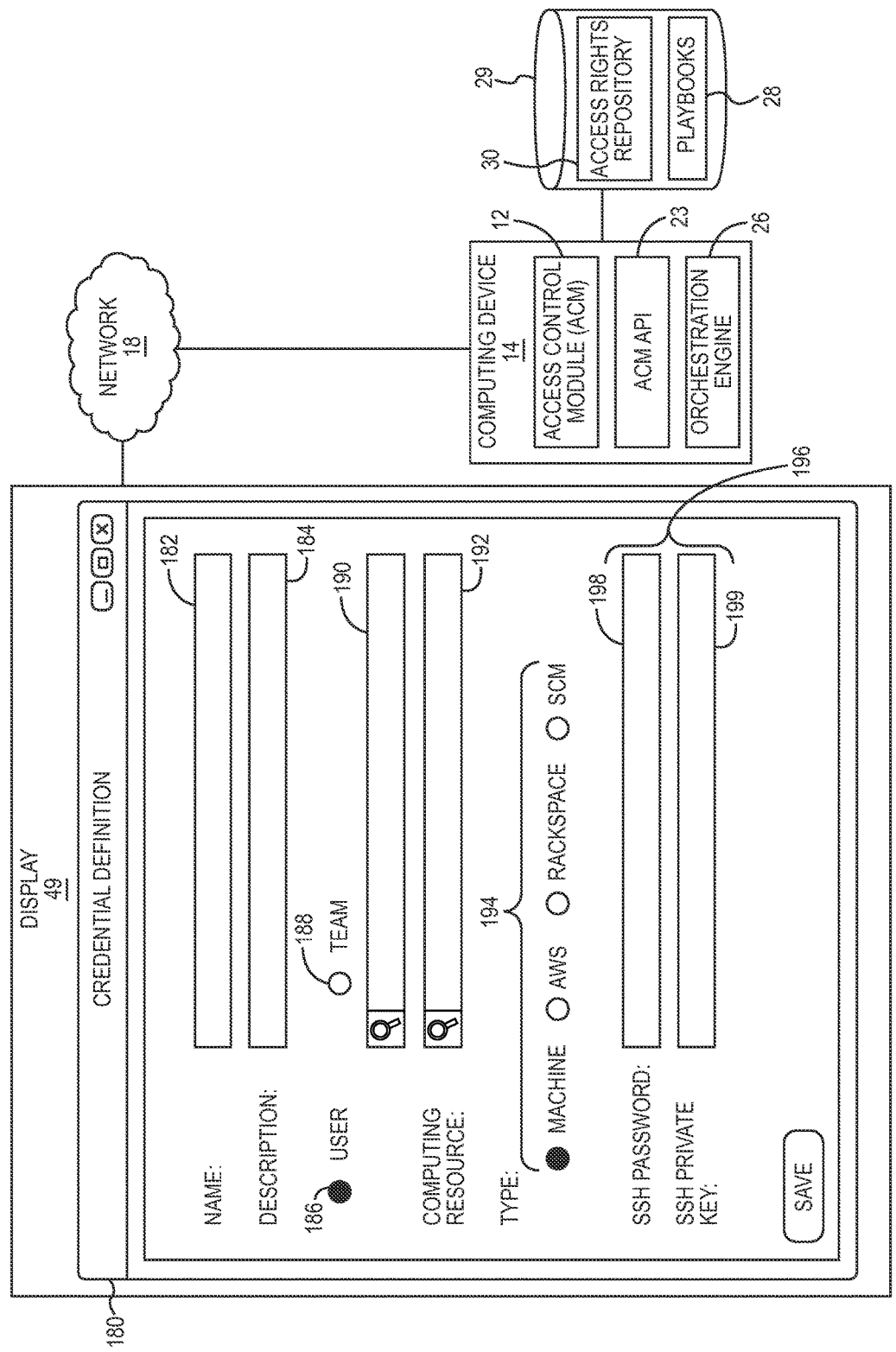
FIG. 10 is a diagram of an example user interface window for generating a credential definition according to one embodiment.

FIG. 10 is a diagram of an example user interface window 180 for generating a credential according to one embodiment. Credentials can take many different forms, and may differ depending on the type of computing resource 24 with which the credential may be used, but generally, a credential is utilized by a computing resource 24 to ensure that actions directed to be performed on the computing resource 24 are being directed by a "trusted" entity, such as the user 20-1. The user interface window 180 identifies certain types of credentials, but the embodiments are not limited to the disclosed types, and have applicability with any authentication information that may be utilized by a computing resource 24 to condition modification of the computing resource 24 on the receipt of valid authentication information. A credential name control 182 enables the user 20-1 to provide a credential name for the credential. A credential description control 184 enables the user 20-1 to provide a credential description for the credential. In some embodiments, a credential may be either a user-type credential which may be associated with one or more users 20, or a team-type credential which may be associated with a team, but in other embodiments, any credential may be assigned to a user 20 and/or a team. In the embodiment illustrated in FIG. 10, a user-type radio control 186 enables the user 20-1 to designate the credential as a user-type credential, and a team-type radio control 188 enables the user 20-1 to designate the credential as a team-type credential. A user owner control 190 enables the user 20-1 to identify a user 20 that owns this credential. A computing resource control 192 enables the user 20-1 to identify a computing resource 24 that may utilize this credential for authentication. One or more radio controls 194 may be used to designate a particular type of credential. Depending on the type selected via the radio control 194, an area 196 of the user interface window 180 may present different controls for entry of respective authentication information.

Some credentials, such as machine-type credentials, may require a secure shell (SSH) password that may be entered via a SSH password control 198. The SSH password may be stored in an encrypted form in the credential definition 40. A machine-type credential may also, or alternatively, utilize a SSH private key used to authenticate a particular user 20 via SSH, which may be entered via a SSH private key control 199. The SSH private key may be stored in an encrypted form in the credential definition 40. The user 20-1 may also be able to provide a SUDO password used to authenticate a user 20 to SUDO.

Credentials may also be used to authenticate with a cloud provider, such as Amazon Web Services (AWS) or Rackspace. For example, if the AWS radio control 194 is selected, the user 20-1 may provide an AWS access key and a secret key that is stored in the credential definition 40. If the Rackspace radio control 194 is selected, the user 20-1 may provide a Rackspace username and Application Programming Interface (API) key that is stored in the credential definition 40. AWS and Rackspace are merely examples of cloud providers, and the embodiments are not limited to any particular cloud provider.

If the Source Code Management (SCM) radio control 194 is selected, the user 20-1 may provide a username, password and/or SCM private key and key password for use with, for example, Git, Apache Subversion (SVN) or Mercurial remote revision control systems.

Figure 11:
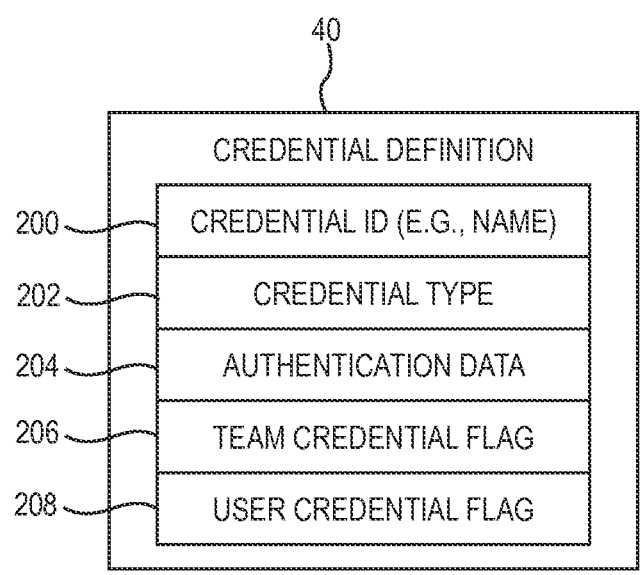
FIG. 11 is a block diagram illustrating a credential definition according to one embodiment.

FIG. 11 is a block diagram illustrating a credential definition 40 that defines a credential according to one embodiment. The credential definition 40 includes a credential ID field 200 that identifies a name of the credential. A credential type field 202 identifies the credential as, for example, a machine-type credential, an AWS-type credential, a Rackspace-type credential, or an SCM-type credential. Authentication data 204 may differ depending on the credential type and on the particular computing device 14 to which the credential definition 40 applies, but may include, for example, a secure shell (SSH) password, a SSH private key used to authenticate a particular user 20 to a computing resource 24, a SUDO password used to authenticate a user 20 to SUDO, or the like. The authentication data 204 may be encrypted by the access control module 12 prior to being stored in the access rights repository 30. The credential definition 40 may include a team credential flag 206 and user credential flag 208 to identify the credential as a team-type credential or user-type credential, respectively.

In one embodiment, once the access control module 12 receives and stores the authentication information associated with a credential, the access control module 12 will not provide the authentication information to a user 20, thereby preventing a user 20, other than the original user 20 who created the credential, from ever seeing the authentication information. As will be discussed in greater detail herein, in some embodiments the access control module 12 may use the authentication information in conjunction with launching a playbook 28; however, the playbook 28 launching mechanism involves inter-process communication between the access control module 12 and the orchestration engine 26. Thus, the communication of the authentication information by the access control module 12 to the orchestration engine 26 is not seen by the user 20.

Figure 12:
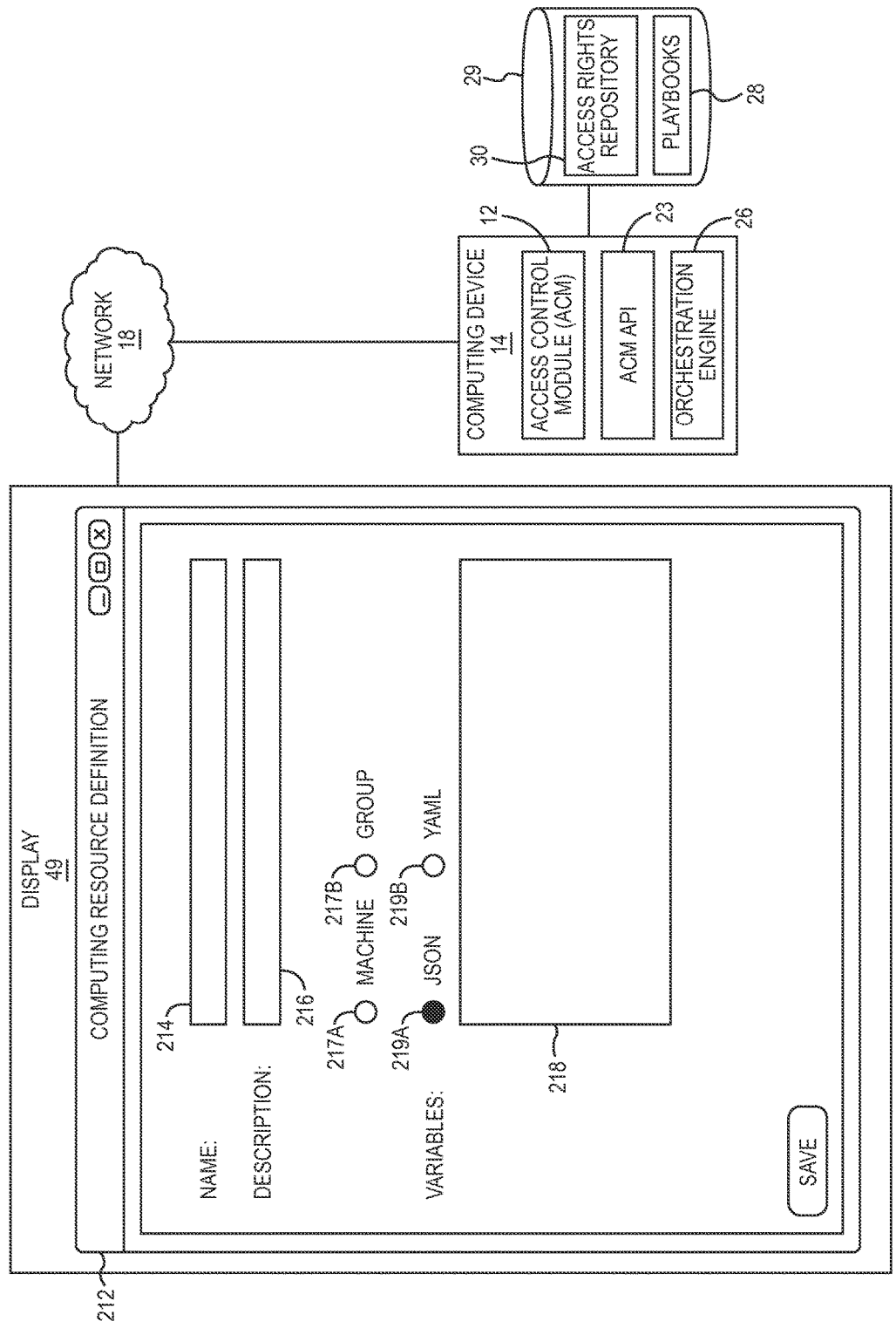
FIG. 12 is a diagram of an example user interface window for generating a computing resource definition according to one embodiment.

FIG. 12 is a diagram of an example user interface window 212 for generating a computing resource definition 42 according to one embodiment. A computing resource definition 42 identifies a computing resource 24 to the access control module 12. A name control 214 enables the user 20-1 to provide a reference, such as an Internet Protocol (IP) address, a Domain Name System (DNS) name, or any other reference that can be used to communicate with the computing resource 24. A description control 216 enables the user 20-1 to provide a description of the computing resource 24.

In some embodiments, the user interface window 212 may allow the user 20-1 to select a radio button control 217A or 217B to indicate a computing resource type, such as a machine-type computing resource 24, or a group-type computing resource 24. If the computing resource type is a group-type computing resource, the user interface window 212 may change to allow the user 20-1 to define a group of individual computing devices. Actions may then be initiated against the group, such that the action is performed against each computing device in the group.

As one example, a computing resource group may define a plurality of computing devices provided by a third-party cloud provider, such as, by way of non-limiting example, an AWS EC2 cloud provider or a Rackspace cloud provider. In one embodiment, the user 20-1 may be able to identify one or more regions associated with the particular cloud provider, and may be requested to identify a credential that is identified by a credential definition 40 for use with the respective cloud provider. If supported by the respective cloud provider, the user 20-1 may initiate a synchronization button (not illustrated), which causes the access control module 12 to communicate with the identified cloud provider using the identified credential to automatically obtain from the cloud provider identification of one or more computing devices, such as computer servers, that are provided by the cloud provider for use by the user 20-1 based on the identified credential. The access control module 12 may then associate the computing devices provided by the cloud provider with the computing resource 24 without the user 20-1 having to manually enter such computing device into the user interface window 212.

A variable control 218 enables the user 20-1 to provide data, in the form of variables and values, which may be provided to the computing resource 24 when actions are performed on the computing resource 24. Variable type radio buttons 219A and 219B enable the user 20-1 to indicate a format, or language, in which the variables are written. For example, selection of the variable type radio buttons 219A indicates that the variables are provided in a JavaScript Object Notation (JSON) format, and selection of the variable type radio button 219B indicates that the variables are provided in a YAML format. While JSON and YAML formats are illustrated for purposes of convenience, the embodiments are not limited to providing variables in any particular format.

Figure 13:
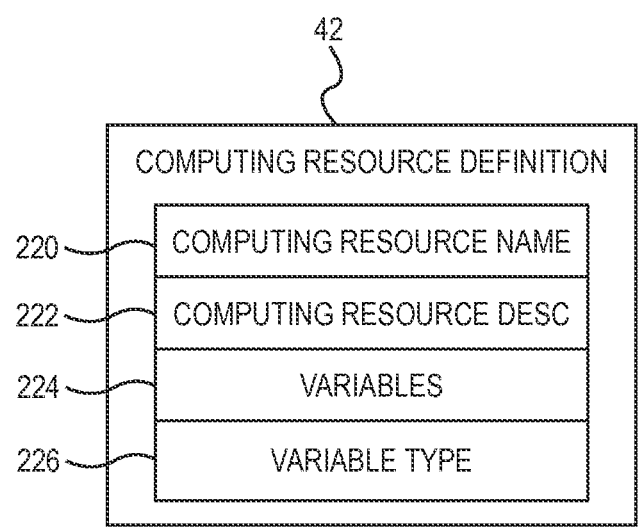
FIG. 13 is a block diagram illustrating a computing resource definition according to one embodiment.

FIG. 13 is a block diagram illustrating a computing resource definition 42 according to one embodiment. The computing resource definition 42 may differ depending on the type of computing resource 24 that is identified by the computing resource definition 42. Assuming the computing resource definition 42 is for a machine, the computing resource definition 42 may include a computing resource name field 220 that identifies information, such as an IP address or DNS name, which can be used to access the computing resource 24. A computing resource description field 222 contains a description of the computing resource 24. A variables field 224 contains variables that may be provided to the computing resource 24 when actions are performed against the computing resource 24. A variable-type field 226 identifies a syntax of the variables in the variables field 224.

Figure 14:
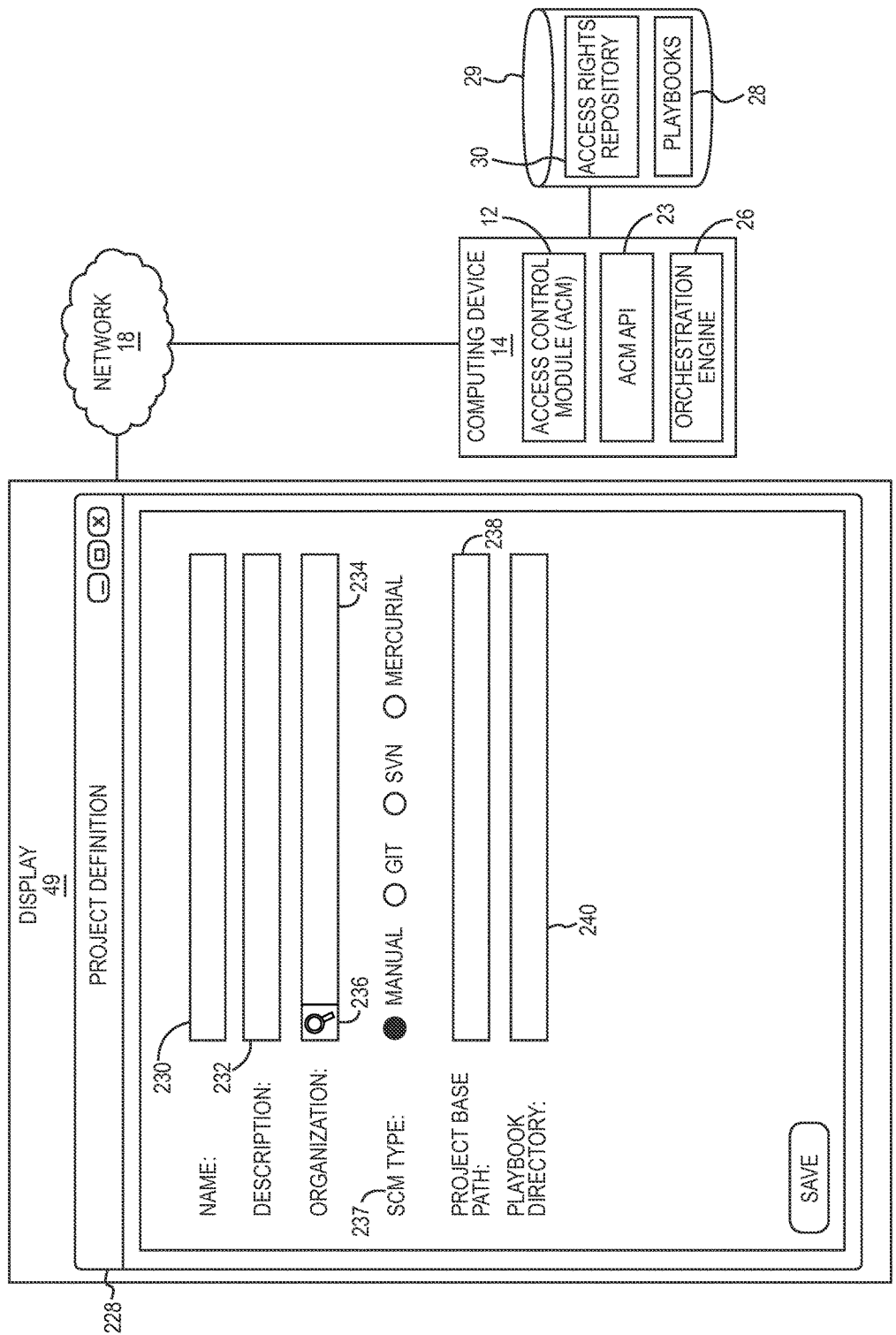
FIG. 14 is a diagram of an example user interface window for generating a project definition according to one embodiment.

FIG. 14 is a diagram of an example user interface window 228 for generating a project definition 44 according to one embodiment. A project definition 44 identifies one or more playbooks 28 that may be performed against a computing resource 24. A project name control 230 enables the user 20-1 to provide a project name for the project. A project description control 232 enables the user 20-1 to provide a project description for the project. An organization control 234 enables the user 20-1 to identify an organization for the project. Selection of an organization search control 236 causes the access control module 12 to access the access rights repository 30 and list the available organizations. A project type control 237 enables the user 20-1 to identify a type of project, such as manual, Git, SVN, or Mercurial. The user interface window 228 may change based on the selection of a particular project type. If source code for the software system is maintained by a source control system, such as Git, SVN, or Mercurial, the particular source control system may be selected by the user 20-1. Selection of a source control system allows the entry of information (not illustrated), such as a URL, that identifies the location of the source control system, and a credential to authenticate access to the particular source control system. Assuming that the project type is manual, a project base path control 238 enables the user 20-1 to enter a path that identifies a file system path associated with the project. A playbook directory control 240 enables the user 20-1 to select a particular playbook directory under the base path identified in the project base path control 238. The playbook directory identifies a folder in which one or more playbooks 28 may be located. A playbook 28, as discussed above, contains a set of actions that are performed against one or more of the computing resources 24. The playbooks 28 may be written by a user 20 familiar with the particular set of actions to be performed against the respective computing resource 24.

Figure 15:
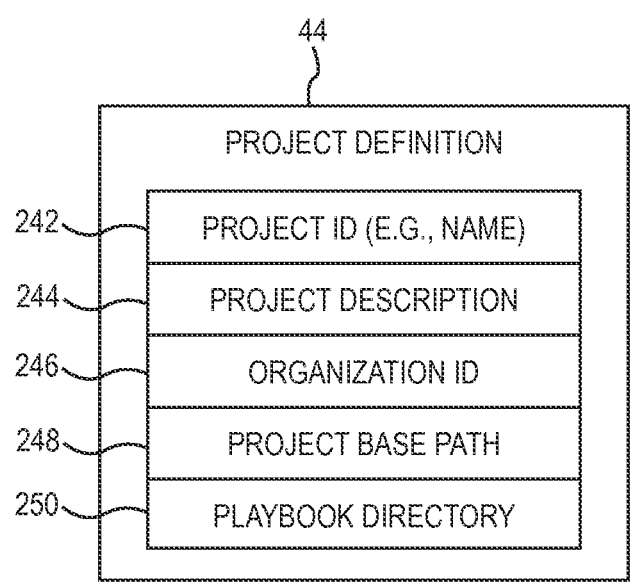
FIG. 15 is a block diagram illustrating a project definition according to one embodiment.

FIG. 15 is a block diagram illustrating a project definition 44 according to one embodiment. The project definition 44 may differ depending on the type of project definition 44 that is identified by the computing resource definition 42, such as a manual type, Git type, SVN type or Mercurial type. Assuming that the project definition 44 is a manual type project definition 44, the project definition 44 may include a project ID field 242 that identifies a name of the project. A project description field 244 contains a description of the project. An organization ID field 246 identifies the organization with which the project is associated. A project base path field 248 identifies a base path in which a playbook 28 associated with the project can be identified. A playbook directory field 250 identifies a directory in which a playbook 28 associated with the project can be located. If the computing resource definition 42 identified a source control system, such as Git, SVN, or Mercurial, the computing resource definition 42 may include additional fields such as a field to identify a URL of the source control system, and a credential ID field to identify a credential that may be used to authenticate to the source control system.

Figure 16:
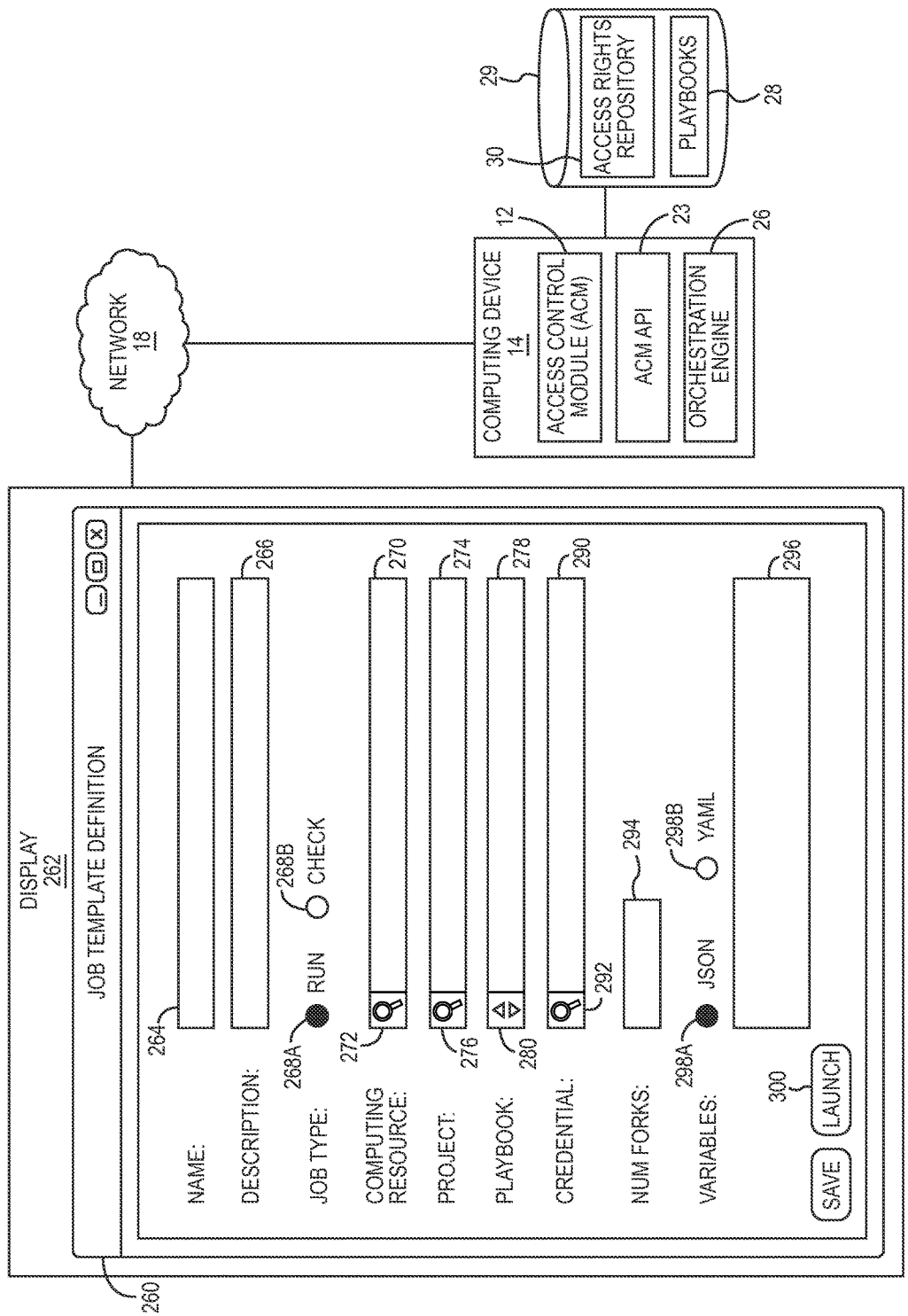
FIG. 16 is a diagram of an example user interface window for generating a job template definition according to one embodiment.

According to one embodiment, a job template provides a mechanism for launching a playbook 28 against a computing resource 24. When processing a job template, the access control module 12 utilizes the access rights repository 30, and access control definitions 48 discussed herein, to ensure that a user 20 has appropriate permissions, based either on the respective user 20, or a role the user 20 has on a team, to access the respective computing resource 24. The access control module 12 also utilizes the access rights repository 30, and access control definitions 48 discussed herein, to ensure that the user 20 has access to the appropriate credential(s) to authenticate with the computing resource 24. For purposes of illustration, assume that the user 20-2 desires to launch a playbook 28 against the computing resource 24-2. The user 20-2 logs into the access control module 12 using, for example, the username and password provided in the user definition 36 that corresponds to the user 20-2. After logging in, the user 20-2 may select a link, or other reference, indicating a desire to create a job template. FIG. 16 is a diagram of an example user interface window 260 that may be presented on a display 262 associated with the client computer 16-2 (FIG. 1) to facilitate the generation of a job template definition according to one embodiment. A job template name control 264 enables the user 20-2 to provide a job template name for the job template. A job template description control 266 enables the user 20-2 to provide a job template description for the job template.

A job type field allows the user 20-2 to select either a Run-type job radio control 268A or a Check-type radio control 268B to identify whether the job is for actual execution against a computing resource 24, or is merely a "dry-run." A computing resource control 270 allows the user 20-2 to identify a computing resource 24 against which the job will be executed, or launched. Selection of a computing resource search control 272 causes the access control module 12 to access the access rights repository 30 and list the computing resources 24 which the user 20-2 has permission to access. In order to determine such computing resources 24, the access control module 12 determines the set of those permissions defined by permission definitions 38 that are associated with the user 20-2, as well as each permission defined by a permission definition 38 that is associated with a team of which the user 20-2 is a member. Thus, even though no permission definition 38 may directly grant the user 20-2 a right to access a particular computing resource 24, if the user 20-2 is a member of a team that has been granted a permission to access the particular computing resource 24 via a permission definition 38, the access control module 12 allows the user 20-2 to access the particular computing resource 24.

A project control 274 allows the user 20-2 to identify a project defined by a project definition 44. Selection of a project search control 276 causes the access control module 12 to access the access rights repository 30 and list the projects available to the user 20-2. A playbook control 278 enables the user 20-2 to identify a particular playbook 28 for execution against the computing resource 24 identified in the computing resource control 270. Selection of a playbook search control 280 causes the access control module 12 to access the project base path of the project identified in the project control 274 and list the playbooks 28 found in such project base path. The user 20-2 may then select one of such playbooks 28.

A credential control 290 allows the user 20-2 to identify a credential defined by a credential definition 40 for use in authenticating with the computing resource 14 identified in the computing resource control 270. Selection of a credential search control 292 causes the access control module 12 to access the access rights repository 30 and list the credentials available to the user 20-2. The set of credentials available to the user 20-2 include those credentials defined by credential definitions that have been directly associated with the user 20-2, and those credentials defined by credential definitions associated with each team of which the user 20-2 is a member.

In some embodiments, the access control module 12 can facilitate parallel processing of actions identified in a playbook 28. A number of forks control 294 enables the user 20-2 to designate a maximum number of such parallel processes. A variables control 296 allows the user 20-2 to identify variables that may be used in conjunction with the playbook 28. Radio controls 298A and 298B allow the user 20-2 to identify a syntax of any variables provided in the variables control 296.

Upon successful creation of a job template, the user 20-2 may request that the access control module 12 initiate the playbook 28 identified in the playbook control 278 against the computing resource 24 identified in the computing resource control 270, such as by selecting a launch control 300, or via some other suitable user input. Upon receipt of the request to initiate the playbook 28 against the computing resource 24, the access control module 12 may first validate, again, that the user 20-2 associated with the request has the appropriate permissions, as discussed above, to access the computing resource 24, and may also validate that the credential identified in the request is designated as being associated with the user 20-2, or a team of which the user 20-2 is a member, prior to processing the request.

The access control module 12 may then generate a reference, such as a URL, to the playbook 28. The access control module 12 also accesses the credential definition 40 associated with the credential identified in the credential control 290. The access control module 12 extracts from the respective credential definition 40 the associated authentication information maintained in the credential definition 40. In some embodiments, the authentication information may be maintained in an encrypted form, in which case the access control module 12 may decrypt the authentication information. The access control module 12 provides the reference to the playbook 28 and the authentication information to the orchestration engine 26 for further processing. The orchestration engine 26 first provides the authentication information to the computing resource 24 in order to authenticate the imminent actions with the computing resource 24, and thereafter processes the actions identified in the playbook 28 against the computing resource 24.

Figure 17:
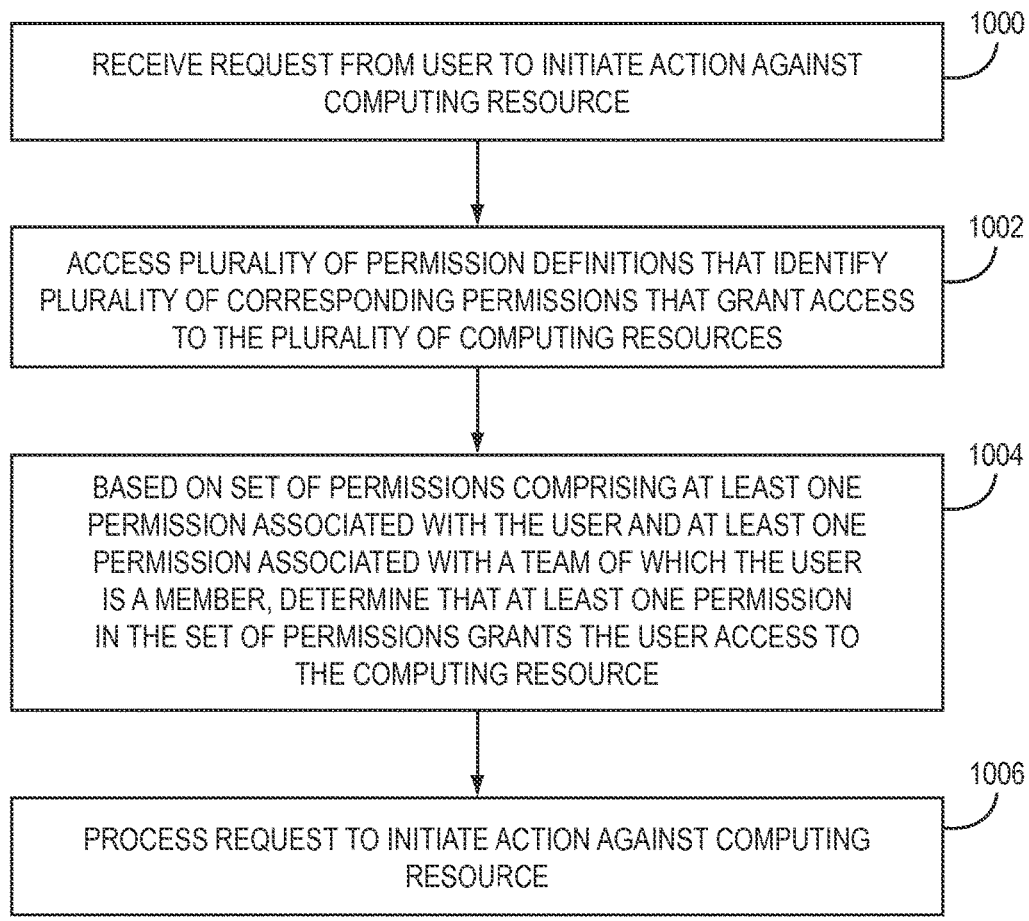
FIG. 17 is a flowchart of a method for controlling access to a computing resource according to one embodiment.

FIG. 17 is a flowchart of a method for controlling access to a computing resource according to one embodiment. FIG. 17 will be discussed in conjunction with FIG. 1. Assume for purposes of illustration that the user 20-2 desires to launch a playbook 28 via a job template defined by a job template definition 46 against the computing resource 24-1. The access control module 12 receives the request to initiate the actions identified in the playbook 28 against the computing resource 24-1 (FIG. 17, block 1000). The access control module 12 accesses the permission definitions 38 (FIG. 17, block 1002). The access control module 12 then determines, based on the set of permissions that includes those permissions that are associated with the user 20-2 and those permissions that are associated with each team of which the user 20-2 is a member, that the user 20-2 has permission to deploy actions against the computing resource 24-1 (FIG. 17, block 1004). The access control module 12 then processes the request, such as by providing a link to the playbook 28 to the orchestration engine 26 (FIG. 17, block 1006).

Figure 18:
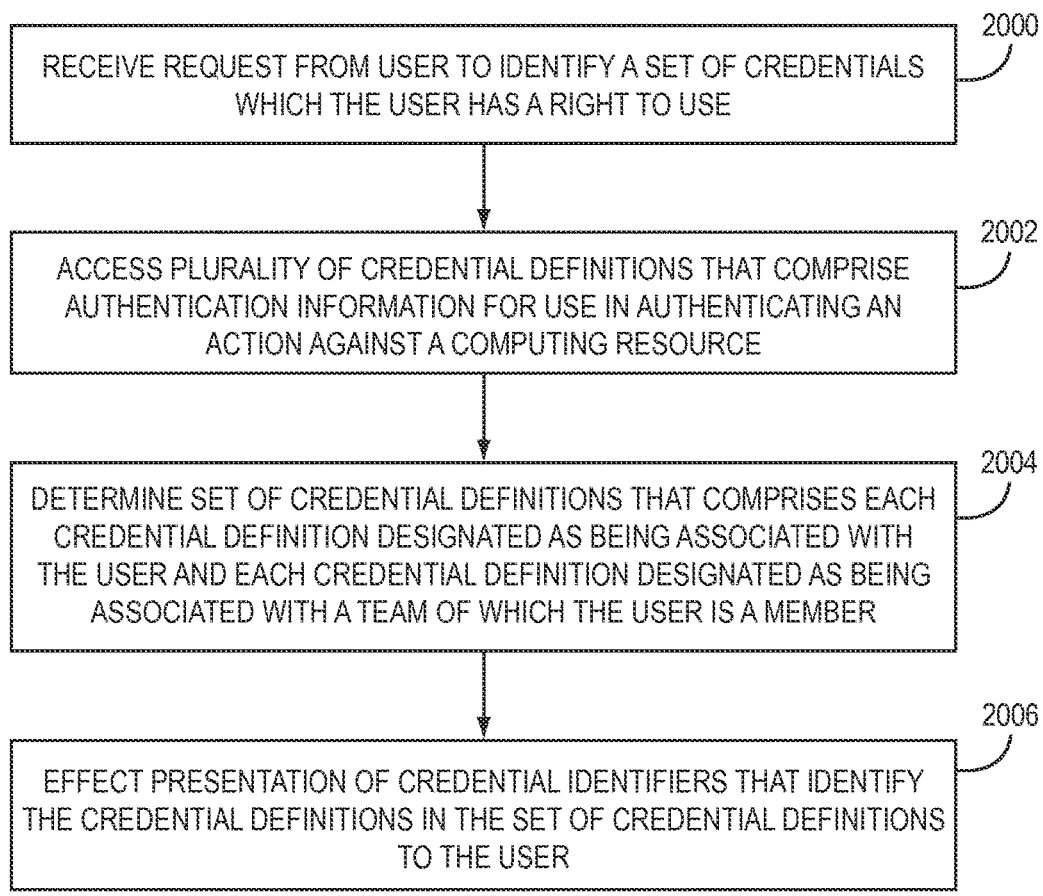
FIG. 18 is a flowchart of a method for presenting credentials to a user for selection, according to one embodiment.

FIG. 18 is a flowchart of a method for presenting credentials to a user 20 for selection, according to one embodiment. FIG. 18 will be discussed in conjunction with FIG. 16, in the context of generating a job template definition 46. Assume that the user 20-2 has selected the credential search control 292 to receive a list of the credentials to which the user 20-2 has access. The access control module 12 receives the request from the user 20-2 by virtue of the user 20-2 selecting the credential search control 292 (FIG. 18, block 2000). The access control module 12 accesses the credential definitions 40 to determine the set of credentials that includes each credential definition designated as being associated with the user 20-2 and each credential definition designated as being associated with a team of which the user 20-2 is a member (FIG. 18, blocks 2002-2004). The access control module 12 effects presentation of credential identifiers, such as the names of the credentials, of the credential definitions 40 in the set of credential definitions to the user 20-2 (FIG. 18, block 2006). As used herein, effecting presentation means that the access control module 12 either directly presents the information to the user 20-2, or indirectly presents the information to the user 20-2 through another computer device, such as the client computer 16-2.

Figure 19:
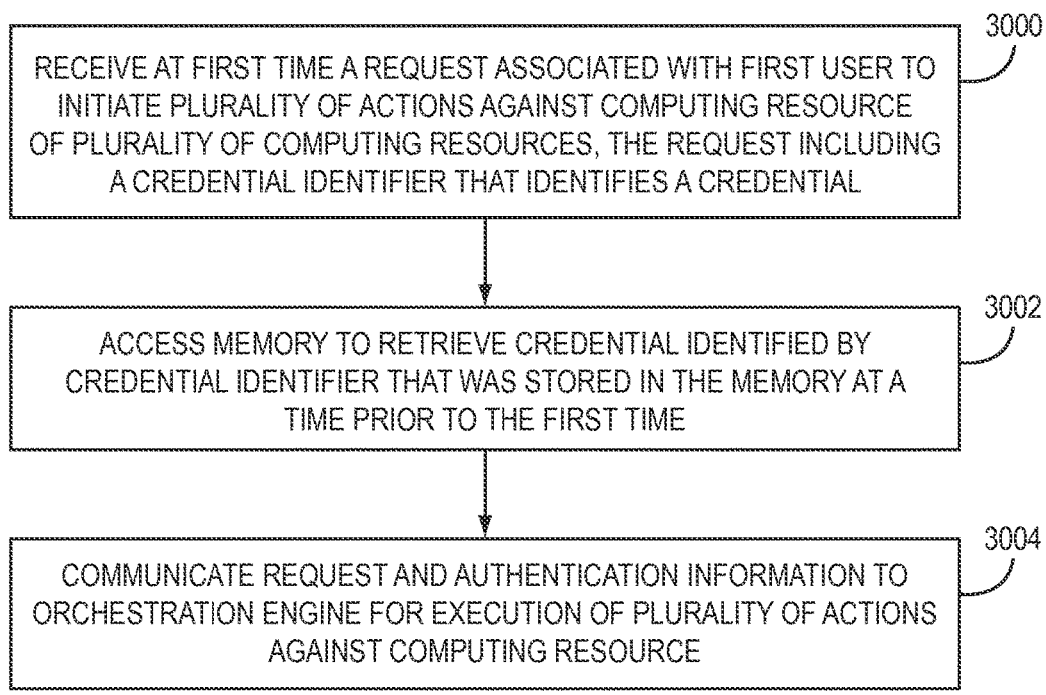
FIG. 19 is a flowchart of a method for accessing credentials according to one embodiment.

FIG. 19 is a flowchart of a method for accessing credentials according to one embodiment. FIG. 19 will be discussed in conjunction with FIG. 1. Assume for purposes of illustration that the user 20-2 desires to launch a playbook 28 via a job template defined by a job template definition 46 against the computing resource 24-1. The access control module 12 receives the request to initiate the actions identified in the playbook 28 against the computing resource 24-1 along with a credential identifier (FIG. 19, block 3000). The access control module 12 accesses the access rights repository 30 in the storage 29 to retrieve the credential identified by the credential identifier, which was stored in the access rights repository 30 prior to the time of the request (FIG. 19, block 3002). The credential may have been stored in the access rights repository 30 by a user 20 other than the user 20-2. The access control module 12 then processes the request, such as by providing to the orchestration engine 26 a link to the playbook 28 along with the credential (FIG. 18, block 3004). The access control module 12 interacts with the orchestration engine 26 using an inter-process communication mechanism, such as an API, or the like. Accordingly, the access control module 12 can communicate the credential to the orchestration engine 26 in a manner that precludes the user 20-2 from ever seeing the authentication information.

Figure 20:
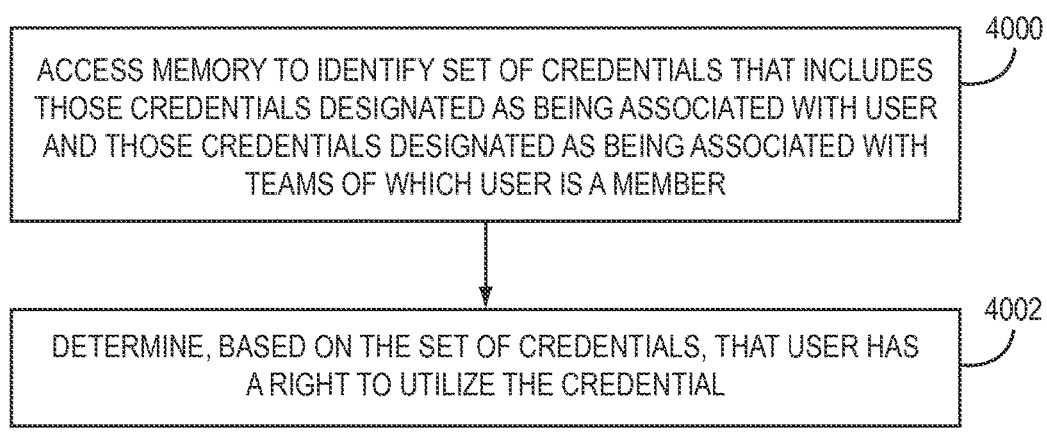
FIG. 20 is a flowchart of a method for determining that a user has appropriate rights to utilize a credential.

FIG. 20 is a flowchart of a method for determining that a user 20 has appropriate rights to utilize a credential. Assume, as discussed above with regard to FIG. 19, that the user 20-2 desires to launch a playbook 28 via a job template defined by a job template definition 46 against the computing resource 24-1. The access control module 12 receives the request to initiate the actions identified in the playbook 28 against the computing resource 24-1 along with a credential identifier. The access control module 12 accesses the access rights repository 30 to identify a set of credentials that includes those credentials designated as being associated with the user 20-2, and those credentials associated with each team of which the user 20-2 is a member (FIG. 20, block 4000). The access control module 12 then determines whether, based on the set of credentials, the user 20-2 has a right to utilize the credential (FIG. 20, block 4002). In particular, if the credential identified in the request is in the set of credentials, the user 20-2 is determined to have the right to utilize the credential, and if the credential identified in the request is not in the set of credentials, the user 20-2 is determined not to have the right to utilize the credential. If the user 20-2 is determined to have the right to utilize the credential, the access control module 12 provides the credential to the orchestration engine 26 along with a link to the playbook 28, and if not, the access control module 12 may stop processing the request.

Figure 21:
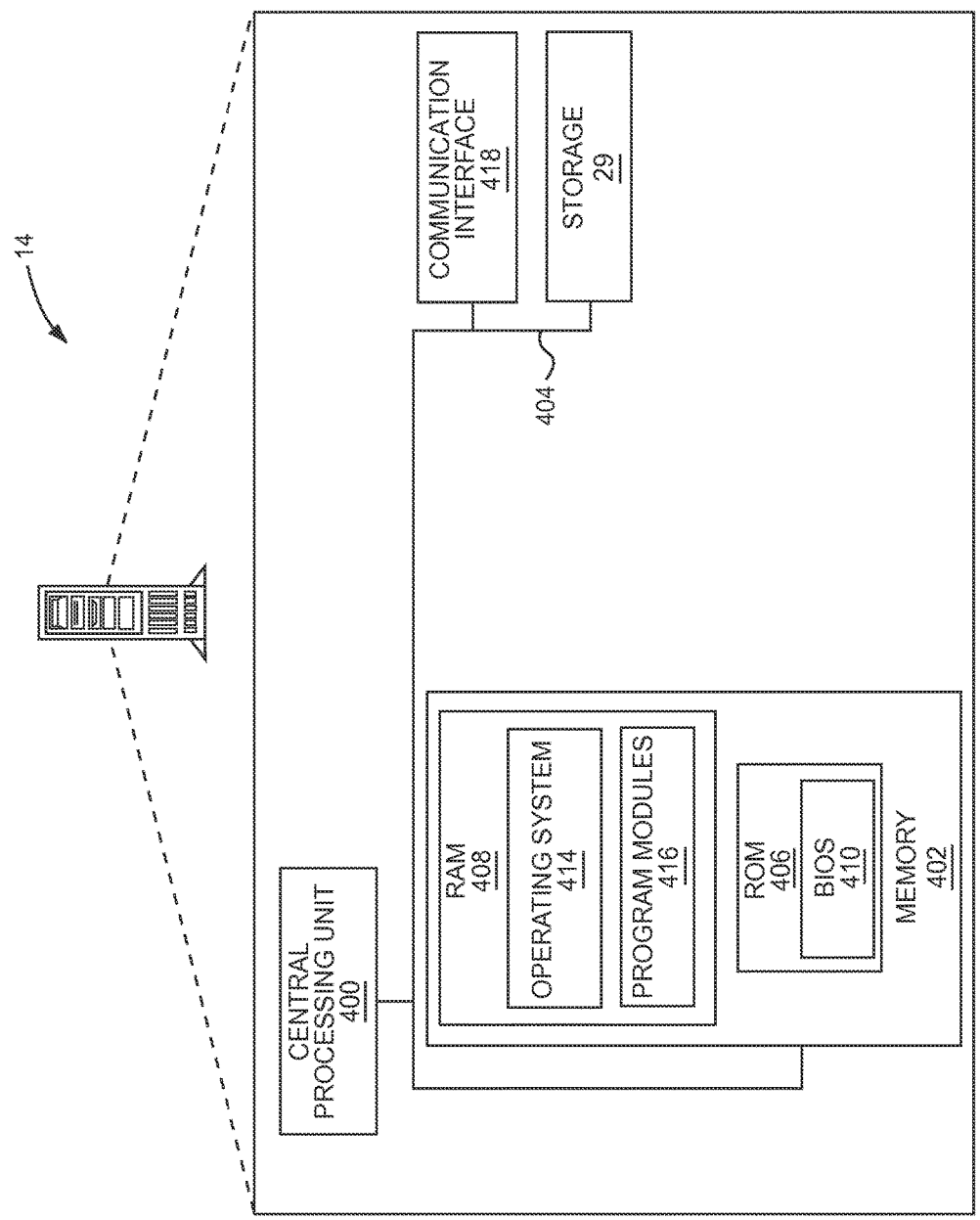
FIG. 21 is a block diagram of a computing device according to one embodiment.

FIG. 21 is a block diagram of the computing device 14 according to one embodiment. The computing device 14 may comprise any computing or processing device capable of including firmware, hardware, and/or executing software instructions to implement the functionality described herein, such as a desktop, laptop, computer server, or the like. The computing device 14 includes a central processing unit 400, a system memory 402, and a system bus 404. The system bus 404 provides an interface for system components including, but not limited to, the system memory 402 and the central processing unit 400. The central processing unit 400 can be any commercially available or proprietary processor.

The system bus 404 may be any of several types of bus structures that may further interconnect to a memory bus (with or without a memory controller), a peripheral bus, and/or a local bus using any of a variety of commercially available bus architectures. The system memory 402 may include non-volatile memory 406 (e.g., read only memory (ROM), erasable programmable read only memory (EPROM), electrically erasable programmable read only memory (EEPROM), etc.) and/or volatile memory 408 (e.g., random access memory (RAM)). A basic input/output system (BIOS) 410 may be stored in the non-volatile memory 406, and can include the basic routines that help to transfer information between elements within the computing device 14. The volatile memory 408 may also include a high-speed RAM, such as static RAM for caching data.

The computing device 14 may further include or be coupled to a computer-readable storage 29, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 29 and other drives, associated with computer-readable media and computer-usable media, may provide non-volatile storage of data, data structures, computer-executable instructions, and the like, including, for example, the access rights repository 30 and playbooks 28. Such media may also contain computer-executable instructions for performing novel methods of the disclosed embodiments.

A number of modules can be stored in the computer-readable storage 29 and in the volatile memory 408, including an operating system 414 and one or more program modules 416, which may implement the functionality described herein in whole or in part, including, for example, the functionality described with respect to the access control module 12. It is to be appreciated that the embodiments can be implemented with various commercially available operating systems 414 or combinations of operating systems 414.

All or a portion of the embodiments may be implemented as a computer program product stored on a transitory or non-transitory computer-usable or computer-readable storage medium, such as the computer-readable storage 29, which includes complex programming instructions, such as complex computer-readable program code, configured to cause the central processing unit 400 to carry out the steps described herein. Thus, the computer-readable program code can comprise software instructions for implementing the functionality of the embodiments described herein when executed on the central processing unit 400. The central processing unit 400, in conjunction with the program modules 416 in the volatile memory 408, may serve as a controller for the computing device 14 that is configured to, or adapted to, implement the functionality described herein.

The computing device 14 may also include a communication interface 418, suitable for communicating with the network 18 and other networks as appropriate or desired.

While for purposes of illustration the embodiments have been discussed in conjunction with a user interface, some or all of the functionality discussed herein, and in particular the launching of job templates, the determination that a user has appropriate permissions, and the use of credentials, may all be triggered programmatically via appropriate invocation of the API 23.

Those skilled in the art will recognize improvements and modifications to the preferred embodiments of the disclosure. All such improvements and modifications are considered within the scope of the concepts disclosed herein and the claims that follow.

What is claimed is:
1. A method, comprising:
  receiving, by a computing device, at a first time a request associated with a user to initiate a plurality of actions against a plurality of computing resources, the request including a credential identifier that identifies a credential;

accessing a memory, based on the credential identifier, to retrieve the credential identified by the credential identifier that was stored in the memory at a time prior to the first time, the credential comprising authentication information configured to authenticate the plurality of actions to the plurality of computing resources; and communicating, by the computing device, the request and the authentication information to an orchestration engine for execution of the plurality of actions against the plurality of computing resources without presenting the authentication information to the user such that the user is prevented from viewing the authentication information.

2. The method of claim 1, further comprising:

accessing the memory to identify a set of credentials that comprises one or more credentials designated as being associated with the user and one or more credentials designated as being associated with a team of which the user is a member; and determining, based on the set of credentials, that the user has a right to utilize the credential.

3. The method of claim 1, wherein the credential is not designated as being associated with the user, and the credential is designated as being associated with the team of which the user is a member.

4. The method of claim 1, further comprising:

receiving, prior to the first time, a request from a second user to generate the credential, the request including the credential identifier and the authentication information;

generating the credential; and storing the credential in the memory.

5. The method of claim 4, further comprising:

encrypting the authentication information prior to storing the credential in the memory.

6. The method of claim 5, further comprising:

decrypting the authentication information prior to communicating the authentication information to the orchestration engine.

7. The method of claim 1, further comprising:

accessing, by the computing device, a plurality of permission definitions stored in the memory that identifies a plurality of corresponding permissions that grant access to the plurality of computing resources; and based on a set of permissions comprising at least one permission associated with the user and at least one permission associated with a team of which the user is a member, determining that at least one permission in the set of permissions grants the user access to the plurality of computing resources.

8. The method of claim 1, further comprising:

receiving, by the computing device, a request to identify credentials which the first user has a right to use;

accessing the memory to identify a set of credentials that comprises each credential designated as being associated with the user and each credential designated as being associated with a team of which the user is a member;

effecting presentation of credential identifiers that identify the credentials in the set of credentials to the user.

9. The method of claim 8, wherein each credential of the set of credentials comprises a particular credential type of a plurality of credential types, and further comprising:

receiving, by the computing device, a request to identify credentials of a first credential type which the first user has a right to use;

accessing the memory to identify a set of credentials that comprises each credential of the first credential type that is designated as being associated with the user and each credential of the first credential type that is designated as being associated with a team of which the user is a member;

effecting presentation of credential identifiers that identify the credentials of the first credential type in the set of credentials to the user.

10. The method of claim 1, wherein the plurality of computing resources comprises a cloud computing resource, and the credential comprises a cloud-type credential that authenticates the plurality of actions with the cloud computing resource.

11. A computing device, comprising:

a communications interface configured to communicate with a network; and a processor coupled to the communications interface, and configured to:

receive at a first time a request associated with a first user to initiate a plurality of actions against a plurality of computing resources, the request including a credential identifier that identifies a credential;

access a memory, based on the credential identifier, to retrieve the credential identified by the credential identifier that was stored in the memory at a time prior to the first time, the credential comprising authentication information configured to authenticate the plurality of actions to the plurality of computing resources; and communicate the request and the authentication information to an orchestration engine for execution of the plurality of actions against the plurality of computing resources without presenting the authentication information to the user such that the user is prevented from viewing the authentication information.

12. The computing device of claim 11, wherein the processor is further configured to:

access the memory to identify a set of credentials that comprises one or more credentials designated as being associated with the user and one or more credentials designated as being associated with a team of which the user is a member; and determine, based on the set of credentials, that the user has a right to utilize the credential.

13. The computing device of claim 11, wherein the credential is not designated as being associated with the user, and the credential is designated as being associated with the team of which the user is a member.

14. The computing device of claim 11, wherein the processor is further configured to:

receive a request to identify credentials which the first user has a right to use;

access the memory to identify a set of credentials that comprises each credential designated as being associated with the user and each credential designated as being associated with a team of which the user is a member;

effect presentation of credential identifiers that identify the credentials in the set of credentials to the user.

15. A computer program product stored on a non-transitory computer-readable storage medium and including instructions configured to cause a processor to carry out the steps of:

receiving at a first time a request associated with a first user to initiate a plurality of actions against a plurality of computing resources, the request including a credential identifier that identifies a credential;

accessing a memory, based on the credential identifier, to retrieve the credential identified by the credential identifier that was stored in the memory at a time prior to the first time, the credential comprising authentication information configured to authenticate the plurality of actions to the plurality of computing resources; and communicating the request and the authentication information to an orchestration engine for execution of the plurality of computing resources without presenting the authentication information to the user such that the user is prevented from viewing the authentication information.

16. The computer program product of claim 15, wherein the instructions are further configured to cause the processor to carry out the steps of:

accessing the memory to identify a set of credentials that comprises one or more credentials designated as being associated with the user and one or more credentials designated as being associated with a team of which the user is a member; and determining, based on the set of credentials, that the user has a right to utilize the credential.

17. The computer program product of claim 15, wherein the credential is not designated as being associated with the user, and the credential is designated as being associated with the team of which the user is a member.

18. The computer program product of claim 15, wherein the instructions are further configured to cause the processor to carry out the steps of:

receiving a request to identify credentials which the first user has a right to use;

accessing the memory to identify a set of credentials that comprises each credential designated as being associated with the user and each credential designated as being associated with a team of which the user is a member;

effecting presentation of credential identifiers that identify the credentials in the set of credentials to the user.

\* \* \* \* \*